(12) United States Patent
Ikarashi et al.

(10) Patent No.: US 10,074,293 B2
(45) Date of Patent: *Sep. 11, 2018

(54) SECRET CALCULATION METHOD, SECRET CALCULATION SYSTEM, SORTING DEVICE, AND PROGRAM

(71) Applicant: NIPPON TELEGRAPH AND TELEPHONE CORPORATION, Chiyoda-ku (JP)

(72) Inventors: Dai Ikarashi, Musashino (JP); Koki Hamada, Musashino (JP); Ryo Kikuchi, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 52 days.

This patent is subject to a terminal disclaimer.

(21) Appl. No.: 15/108,747

(22) PCT Filed: Jan. 7, 2015

(86) PCT No.: PCT/JP2015/050230
§ 371 (c)(1),
(2) Date: Jun. 28, 2016

(87) PCT Pub. No.: WO2015/107951
PCT Pub. Date: Jul. 23, 2015

(65) Prior Publication Data
US 2016/0321958 A1 Nov. 3, 2016

(30) Foreign Application Priority Data
Jan. 17, 2014 (JP) .................................. 2014-006334

(51) Int. Cl.
*H04L 29/06* (2006.01)
*G09C 1/00* (2006.01)
(Continued)

(52) U.S. Cl.
CPC ............... *G09C 1/00* (2013.01); *G06F 21/60* (2013.01); *H04L 9/085* (2013.01)

(58) Field of Classification Search
None
See application file for complete search history.

(56) References Cited

U.S. PATENT DOCUMENTS 6,901,145 B1 * 5/2005 Bohannon ............... G06F 21/31
380/277
8,064,696 B2 * 11/2011 Radakovic ......... G06K 9/00402
382/181

(Continued)

OTHER PUBLICATIONS

Dai Ikarashi, et al., "An Improvement of Secure Sorting toward 1 sec. Response on Internet", The 31st Symposium on Cryptography and Information Security, Total 9 Pages, (Jan. 21-24, 2014), (with Partial English Translation).

(Continued)

*Primary Examiner* — Malcolm Cribbs
(74) *Attorney, Agent, or Firm* — Oblon, McClelland, Maier & Neustadt, L.L.P.

(57) ABSTRACT

Secret calculation including secret sorting is performed at high speed. Permutation data generation step S10 generates permutation data $\langle\pi_i\rangle$ and $\langle\pi'_i\rangle$ so as to generate permutation data $\langle\pi_L\rangle$. Random ID column generation step S12 generates a random ID column $[\vec{r}_i]$ so as to generate a random ID column $[\vec{r}_L]$. Secret random permutation step S14 performs secret random permutation of a set composed of a random ID column $[\vec{r}_{i-1}]$, a key column $[\vec{k}_i]$, and the random ID column $[\vec{r}_i]$ with the permutation data $\langle\pi_i\rangle$. Flag creation step S16 sets a flag $[f_{j,h}]$ by using a key (Continued)

SECRET CALCULATION SYSTEM $[k_j]=([k_{j,0}], \ldots, [k_{j,L-1}])$. Order table creation step S18 creates an order table $[\vec{s}]$ by using the flag $[f_{j,h}]$. Sort permutation generation step S20 generates sort permutation $\sigma\pi^{-1}_L$ by using the random ID column $[\vec{r}_i]$, the order table $[\vec{s}]$, a post-permutation key column $[\pi_i \vec{k}_i]$, and a post-permutation random ID column $[\pi_i \vec{r}_i]$.

9 Claims, 9 Drawing Sheets

(51) Int. Cl.
*G06F 21/60* (2013.01)
*H04L 9/08* (2006.01)

(56) References Cited

U.S. PATENT DOCUMENTS

| | | | |
|---|---|---|---|
| 9,411,982 | B1* | 8/2016 | Dippenaar .......... G06F 21/6245 |
| 9,703,812 | B2* | 7/2017 | Resch ............... G06F 17/30303 |
| 2004/0179686 | A1* | 9/2004 | Matsumura ............ H04L 9/085 |
| | | | 380/44 |
| 2008/0232580 | A1* | 9/2008 | Hosaka ................... H04L 9/085 |
| | | | 380/28 |
| 2013/0114815 | A1* | 5/2013 | Nishimaki ............ H04L 9/0836 |
| | | | 380/278 |
| 2013/0182836 | A1* | 7/2013 | Hamada ................. H04L 9/085 |
| | | | 380/28 |
| 2013/0272521 | A1* | 10/2013 | Kipnis .................... H04L 9/085 |
| | | | 380/44 |
| 2015/0149763 | A1* | 5/2015 | Kamara .................. H04L 9/083 |
| | | | 713/150 |
| 2016/0335924 | A1* | 11/2016 | Ikarashi .................. G06F 21/60 |

OTHER PUBLICATIONS

Koki Hamada, et al., "A Linear Time Sorting Algorithm on Secure Function Evaluation", The 2011 Symposium on Cryptography and Information Security, pp. 1-7, (Jan. 25-28, 2011), (with Corresponding English Version entitled: "Oblivious Radix Sort: An Efficient Sorting Algorithm for Practical Secure Multi-party Computation", Total 19 Pages.

Koki Hamada, et al., "A Random Permutation Protocol on Three-Party Secure Function Evaluation", Computer Security Symposium, Total 6 Pages, (2010), (with English Abstract).

Dai Ikarashi, et al., "An Extremely Efficient Secret-sharing-based Multi-Party Computation against Malicious Adversary", The 30th Symposium on Cryptography and Information Security, pp. 1-8, (Jan. 22-25, 2013), (with Corresponding English Version entitled: "Actively Private and Correct MPC Scheme in t < n/2 from Passively Secure Schemes with Small Overhead", Total 18 Pages.

Dai Ikarashi, et al., "Actively Private and Correct MPC Scheme in t < n/2 from Passively Secure Schemes with Small Overhead", IACR Cryptology ePrint Archive, vol. 2014, Total 37 Pages, (2014).

Ronald Cramer, et al., "Share Conversion, Pseudorandom Secret-Sharing and Applications to Secure Computation", TCC, LNCS 3378, pp. 342-362, (2005).

International Search Report dated Feb. 10, 2015 in PCT/JP15/050230 Filed Jan. 7, 2015.

* cited by examiner

SECRET CALCULATION METHOD, SECRET CALCULATION SYSTEM, SORTING DEVICE, AND PROGRAM

TECHNICAL FIELD

The present invention relates to a secret calculation technique, and especially relates to a technique for performing secret sorting.

BACKGROUND ART

Secret calculation is a technique in which data processing is performed while concealing data by secret sharing. The secret sharing is a technique in which data is converted into a plurality of distributed values so that original data can be restored by using a certain number or more number of pieces of distributed values, while original data cannot be restored by using distributed values of which the number of pieces is smaller than the certain number. The secret sharing can be categorized into several kinds. Examples of the secret sharing include (k,n)-secret sharing, permutation data secret sharing, and the like.

The (k,n)-secret sharing is secret sharing in which a plain text which is inputted is divided into n pieces of shares so as to be distributed to n pieces of parties $P=(p_0, \ldots, p_{n-1})$ in advance. The plain text can be restored when arbitrary k pieces of shares are provided. Any information on the plain text cannot be obtained from shares of which the number is smaller than k. Specific examples of types of the (k,n)-secret sharing include Shamir secret sharing, reproduction secret sharing, and the like.

The permutation data secret sharing is secret sharing performed while concealing permutation data. The permutation data is data representing the rearrangement way in rearrangement of data columns. When m pieces of data columns are rearranged, permutation data $\pi$ having the volume m is data representing a bijective map $\pi: N_m \to N_m$. Here, $N_m$ represents a collection of non-negative integers which are smaller than an arbitrary integer m. For example, data of which elements in vectors $\vec{x} \in (N_m)^m$ are different from each other can be assumed as random permutation data having the volume m.

More specifically, a vector $\vec{x}=(3,0,2,1)$ can be assumed as random permutation data having the volume 4. For example, it is assumed to rearrange the data column $\vec{y}=(1,5,7,10)$ by the vector $\vec{x}$. 1 which is the 0th element of the data column $\vec{y}$ is moved to the third position represented by the 0th element of the vector $\vec{x}$. 5 which is the first element of the data column $\vec{y}$ is moved to the 0th position represented by the first element of the vector $\vec{x}$. In a similar manner, 7 is moved to the second position and 10 is moved to the first position. As a result, the post-permutation data column $\vec{z}=(5,10,7,1)$ is obtained.

In the permutation data secret sharing, permutation data is concealed by the following procedure. It is assumed that there are N pieces of k party groups of columns $P=\rho_0, \ldots, \rho_{N-1}$. For example, when k=2, each k party group $\rho_i$ is a set $(p_0,p_1)$ of the party $p_0$ and the party $p_1$, a set $(p_0,p_2)$ of the party $p_0$ and the party $p_2$, or the like. It is assumed that all parties in each k party group $\rho_i$ mutually share the permutation data $\pi_{\rho i}$ and the permutation data $\pi_{\rho i}$ is not informed to a complement $\rho^-_i$. Further, a corresponding plain text is assumed to be $\pi_0(\pi_1( \ldots (\pi_{N-1}(I)) \ldots ))$. Here, I represents permutation in which output is performed in the same arrangement as that of input, that is, identical permutation. In this case, if the k party groups of columns $P=\rho_0, \ldots, \rho_{N-1}$ is set so that "(condition 1) any complement $\rho^-_i$ satisfies $\rho \subseteq \rho^-_i$ with respect to an arbitrary k-1 party group $\rho$", any permutation data $\pi_{\rho i}$ is unknown in any coupling of the k-1 party.

For example, when the number n of parties satisfies $n \geq 2k-1$, the above-mentioned condition 1 is satisfied if the column P of the k party groups is set as a collection including all the k party groups. Further, when the number n of parties satisfies $n > 2k-1$, the above-mentioned condition 1 is sometimes satisfied even if not all the k party groups are included. For example, when k=2 and n=4, the condition 1 is satisfied though $\{(p_0,p_1),(p_2,p_3)\}$ does not include all the k party groups.

Secret sorting is processing for rearranging values in accordance with a certain rule based on a key order relation while concealing keys and values which are subjected to secret sharing. As a related art for performing the secret sorting, a technique described in Non-patent Literature 1 is disclosed.

In the secret sorting described in Non-patent Literature 1, a secret sharing value $[\vec{v}]$ of the value column $\vec{v}$ and secret sharing values $[\vec{k}_{L-1}], \ldots, [\vec{k}_0]$ of the key column $\vec{k}$ are inputted and a secret sharing value $[\sigma\vec{v}]$ of the value column $\sigma\vec{v}$ which is subjected to alignment is outputted. Here, $\sigma$ is a permutation function representing sorting. (1) The permutation function $\sigma_0$ is first set as identical mapping on $Z_m$. Here, $Z_m$ is a collection of integers which are equal to or larger than 0 and smaller than m. (2) The random ID column $[\vec{h}]:=[I]$ is set. Here, I represents identical permutation. (3) Processing from (4) to (14) described below is executed with respect to $i=0, \ldots, L-1$. (4) The permutation data $<\pi_0>$, $<\pi_1>$, and $<\pi_2>$ are generated. (5) $[\sigma_{i-1}\vec{k}_i]$ is stably sorted by 1 bit so as to generate the order table $[\vec{s}]$. (6) Secret random permutation of $([\sigma_i\vec{h}],[\vec{s}])$ is performed with the permutation data $<\pi_0>$ so as to generate $([\pi_0\sigma_i\vec{h}],[\pi_0\vec{s}])$. (7) If i=L, the process goes to (15) described below. (8) Secret random permutation of $([\vec{h}],[\vec{k}_{i+1}])$ is performed with the permutation data $<\pi_1>$ so as to generate $([\pi_1\vec{h}],[\pi_1\vec{k}_{i+1}])$. (9) $[\pi_1\vec{h}]$ and $[\pi_0\sigma_i\vec{h}]$ are restored. (10) $[\pi_0\sigma_i\vec{k}_{i+1}]:=\pi_0\sigma_i\vec{h}(\pi_1\vec{h})^{-1}[\pi_1\vec{k}_{i+1}]$ is calculated. (11) Secret random permutation of $([\pi_0\sigma_i\vec{h}],[\pi_0\vec{s}],[\pi_0\sigma_i\vec{k}_{i+1}])$ is performed with the permutation data $<\pi_2>$ so as to generate $([\pi_{20}\sigma_i\vec{h}],[\pi_{20}\vec{s}],[\pi_{20}\sigma_i\vec{k}_{i+1}])$. Here, $\pi_{20}=\pi_2\pi_0$ holds. (12) $[\pi_{20}\vec{s}]$ is restored. (13) $([\vec{s}^{-1}\sigma_i\vec{h}],[\vec{s}^{-1}\sigma_i\vec{k}_{i+1}]):=(\pi_{20}\vec{s})^{-1}([\pi_{20}\sigma_i],[\pi_{20}\sigma_i\vec{k}_{i+1}])$ is calculated. (14) Permutation function $\sigma_{i+1}:=\vec{s}^{-1}\sigma_i$ is set. (15) $[\pi_0\vec{s}]$ and $[\vec{s}^{-1}\sigma_i\vec{h}]$ are restored. (16) Permutation function $\sigma_L:=\vec{s}^{-1}\sigma_{L-1}$ is set. (17) The permutation data $<\pi_3>$ is generated. (18) Permutation of $[\vec{h}]$ and $[\vec{v}]$ is performed with the permutation data $<\pi_3>$ so as to generate $([\pi_3\vec{h}],[\pi_3\vec{v}])$. (19) $[\pi_3\vec{h}]$ and $[\sigma_L\vec{h}]$ are restored so as to output $[\sigma\vec{v}]:=\sigma_L\vec{h}(\pi_3\vec{h})^{-1}[\pi_3\vec{v}]$. Here, permutation function $\sigma=\sigma_L$.

PRIOR ART LITERATURE

Non-Patent Literature

Non-patent Literature 1: Koki Hamada, Dai Ikarashi, Koji Chida, Katsumi Takahashi: "A linear time sorting algorithm on secure function evaluation", Computer Security Symposium 2011, 2011

SUMMARY OF THE INVENTION

Problems to be Solved by the Invention

In the secret sorting technique described in Non-patent Literature 1, production of random ID columns and secret random permutation are repeatedly executed in sequence. Thus, there is a problem in which the number of communication stages is large.

An object of the present invention is to reduce the number of communication stages required for secret sorting and perform secret calculation including secret sorting at high speed.

Means to Solve the Problems

In order to solve the above-described problems, a secret calculation method according to one aspect of the present invention is a secret calculation method in which sort permutation $\sigma\pi^{-1}_L$ for performing alignment of a value column $v^\rightarrow$ is generated by inputting a set composed of a secret sharing value $[k^\rightarrow]$ of a column $k^\rightarrow$ including in pieces of keys $k_0, \ldots, k_{m-1}$ having L bits and a secret sharing value $[v^\rightarrow]$ of the column $v^\rightarrow$ including in pieces of values $v_0, \ldots, v_{m-1}$, and which includes a permutation data generation step in which a permutation data generation unit generates permutation data $<\pi_i>$ and $<\pi'_i>$ so as to generate permutation data $<\pi_L>$ with respect to $i=1, \ldots, L-1$, a random ID column generation step in which a random ID column generation unit generates a random ID column $[r^\rightarrow_i]$ which does not include mutually-overlapped values so as to generate a random ID column $[r^\rightarrow_L]$ which does not include mutually-overlapped values with respect to $i=1, \ldots, L-1$, a secret random permutation step in which a secret random permutation unit performs secret random permutation of a set composed of a random ID column $[r^\rightarrow_{i-1}]$, a key column $[k^\rightarrow_i]$, and the random ID column $[r^\rightarrow_i]$ with the permutation data $<\pi_i>$ so as to generate a set composed of a post-permutation random ID column $\pi_i r^\rightarrow_{i-1}$, a post-permutation key column $[\pi_i k^\rightarrow_i]$, and a post-permutation random ID column $[\pi_i r^\rightarrow_i]$ and performs secret random permutation of a random ID column $[r^\rightarrow_{L-1}]$ with the permutation data $<\pi_L>$ so as to generate a post-permutation random ID column $\pi_L r^\rightarrow_{L-1}$ with respect to $i=1, \ldots, L-1$, a flag creation step in which a flag creation unit determines whether or not $k_j=h$ is satisfied with respect to a key $[k_j]=([k_{j,0}], \ldots, [k_{j,L-1}])$ in cases of $j=0, \ldots, m-1$ and $h=0, \ldots, L-1$ so as to set a flag $[f_{j,h}]$, an order table creation step in which an order table creation unit creates an order table $[s^\rightarrow:=(s_0, \ldots, s_{m-1})]$, in which an order of each of the keys $k_0, \ldots, k_{m-1}$ in an ascending order is set, by using the flag $[f_{j,h}]$, and a sort permutation generation step in which a sort permutation generation unit performs permutation of the random ID column $[r^\rightarrow_i]$ by a permutation function $\sigma_i$ so as to generate a post-permutation random ID column $[\sigma_i r^\rightarrow_i]$ with respect to $i=0, \ldots, L-1$, performs secret random permutation of an order table $[s^\rightarrow]$ and the post-permutation random ID column $[\sigma_i r^\rightarrow_i]$ with the permutation data $<\pi'_i>$ so as to generate a post-permutation order table $\pi'_i s^\rightarrow$ and a post-permutation random ID column $\pi'_i \sigma_i r^\rightarrow_i$, performs alignment of the post-permutation random ID column $\pi'_i \sigma_i r^\rightarrow_i$ based on the post-permutation order table $\pi'_i s^\rightarrow$ so as to generate a post-alignment random ID column $\sigma_{i+1} r^\rightarrow_i$, sets a permutation function $\sigma_{i+1}=s^{\rightarrow-1}\sigma_i$, equally couples a set composed of a post-permutation random ID column $\pi_{i+1} r^\rightarrow_i$, a post-permutation key column $[\pi_{i+1} k^\rightarrow_{i+1}]$, and a post-permutation random ID column $[\pi_{i+1} r^\rightarrow_{i+1}]$ with the post-alignment random ID column $\sigma_{i+1} r^\rightarrow_i$ by using the post-permutation random ID column $\pi_{i+1} r^\rightarrow_i$ as a key with respect to $i=0, \ldots, L-2$, generates a set composed of the post-alignment random ID column $\sigma_{i+1} r^\rightarrow_i$, a post-alignment key column $[\sigma_{i+1} k^\rightarrow_{i+1}]$, and a post-alignment random ID column $[\sigma_{i+1} r^\rightarrow_{i+1}]$, and equally couples the post-permutation random ID column $\pi_L r^\rightarrow_{L-1}$ with a post-alignment random ID column $\sigma_L r^\rightarrow_{L-1}$ so as to generate sort permutation $\sigma\pi^{-1}_L$.

A secret calculation method according to another aspect of the present invention is a secret calculation method in which a post-alignment value column $[\sigma v^\rightarrow]^V$ is generated by inputting a set composed of a secret sharing value $[k^\rightarrow]$ of a column $k^\rightarrow$ including in pieces of keys $k_0, \ldots, k_{m-1}$ having L bits and a secret sharing value $[v^\rightarrow]$ of the column $v^\rightarrow$ including in pieces of values $v_0, \ldots, v_{m-1}$, and which includes a permutation data generation step in which a permutation data generation unit generates permutation data $<\pi_i>$ and $<\pi'_i>$ so as to generate permutation data $<\pi_L>$ with respect to $i=1, \ldots, L-1$, a random ID column generation step in which a random ID column generation unit generates a random ID column $[r^\rightarrow_i]$ which does not include mutually-overlapped values so as to generate a random ID column $[r^\rightarrow_L]$ which does not include mutually-overlapped values with respect to $i=1, \ldots, L-1$, a secret random permutation step in which a secret random permutation unit performs secret random permutation of a set composed of a random ID column $[r^\rightarrow_{i-1}]$, a key column $[k^\rightarrow_i]$, and the random ID column $[r^\rightarrow_i]$ with the permutation data $<\pi_i>$ so as to generate a set composed of a post-permutation random ID column $\pi_i r^\rightarrow_{i-1}$, a post-permutation key column $[\pi_i k^\rightarrow_i]$, and a post-permutation random ID column $[\pi_i r^\rightarrow_i]$ and performs secret random permutation of a random ID column $[r^\rightarrow_{L-1}]$ and a value column $[v^\rightarrow]^V$ with the permutation data $<\pi_L>$ so as to generate a post-permutation random ID column $\pi_L r^\rightarrow_{L-1}$ and a post-permutation value column $[\pi_L v^\rightarrow]^V$ with respect to $i=1, \ldots, L-1$, a flag creation step in which a flag creation unit determines whether or not $k_j=h$ is satisfied with respect to a key $[k_j]=([k_{j,0}], \ldots, [k_{j,L-1}])$ in cases of $j=0, \ldots, m-1$ and $h=0, \ldots, L-1$ so as to set a flag $[f_{j,h}]$, an order table creation step in which an order table creation unit creates an order table $[s^\rightarrow:=(s_0, \ldots, s_{m-1})]$, in which an order of each of the keys $k_0, \ldots, k_{m-1}$ in an ascending order is set, by using the flag $[f_{j,h}]$, and an alignment step in which an alignment unit performs permutation of the random ID column $[r^\rightarrow_i]$ by a permutation function $\sigma_i$ so as to generate a post-permutation random ID column $[\sigma_i r^\rightarrow_i]$ with respect to $i=0, \ldots, L-1$, performs secret random permutation of an order table $[s^\rightarrow]$ and the post-permutation random ID column $[\sigma_i r^\rightarrow_i]$ with the permutation data $<\pi'_i>$ so as to generate a post-permutation order table $\pi'_i s^\rightarrow$ and a post-permutation random ID column $\pi'_i \sigma_i r^\rightarrow_i$, performs alignment of the post-permutation random ID column $\pi'_i \sigma_i r^\rightarrow_i$ based on the post-permutation order table $\pi'_i s^\rightarrow$ so as to generate a post-alignment random ID column $\sigma_{i+1} r^\rightarrow_i$, sets a permutation function $\sigma_{i+1}=s^{\rightarrow-1}\sigma_i$, equally couples a set composed of a post-permutation random ID column $\pi_{i+1} r^\rightarrow_i$, a post-permutation key column $[\pi_{i+1} k^\rightarrow_{i+1}]$, and a post-permutation random ID column $[\pi_{i+1} r^\rightarrow_{i+1}]$ with the post-alignment random ID column $\sigma_{i+1} r^\rightarrow_i$ by using the post-permutation random ID column $\pi_{i+1} r^\rightarrow_i$ as a key with respect to $i=0, \ldots, L-2$, generates a set composed of the post-alignment random ID column $\sigma_{i+1} r^\rightarrow_i$, a post-alignment key column $[\sigma_{i+1} k^\rightarrow_{i+1}]$, and a post-alignment random ID column $[\sigma_{i+1} r^\rightarrow_{i+1}]$, and equally couples a set composed of the post-permutation random ID column $\pi_L r^\rightarrow_{L-1}$ and the post-permutation value column $[\pi_L v^\rightarrow]^V$ with a post-alignment random ID column $\sigma_L r^\rightarrow_{L-1}$ by using the post-permutation random ID column $\pi_L r^\rightarrow_{L-1}$ as a key so as to generate the post-alignment value column $[\sigma v^\rightarrow]^V$.

Effects of the Invention

According to the secret calculation technique of the present invention, the number of communication stages in performing of secret sorting can be reduced. Accordingly, secret calculation including secret sorting can be executed at high speed.

DETAILED DESCRIPTION OF THE EMBODIMENT

Figure 1:
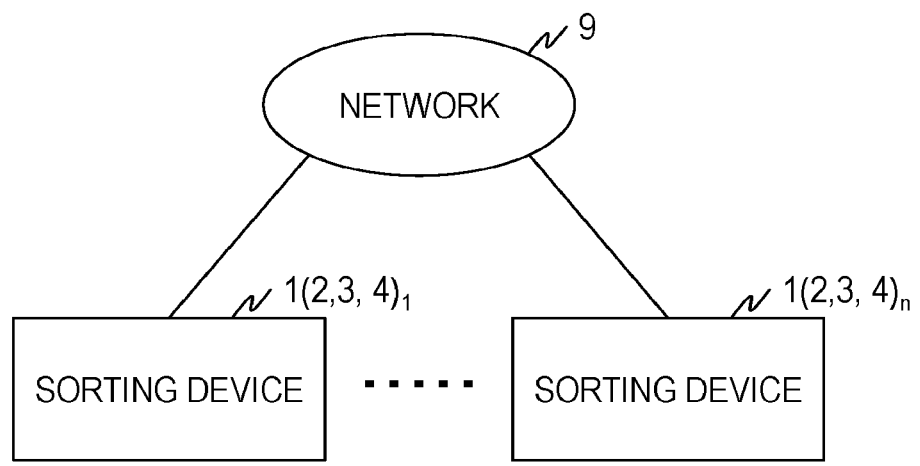
FIG. 1 illustrates the functional configuration of a secret calculation system.

Before provision of the description of embodiments, notation and terms used in this specification are defined.
[Notation]

p represents a party possessing shares.

$P=(p_0, \ldots, p_{n-1})$ represents a collection of the whole of n parties possessing shares.

$\rho=(p_0, \ldots, p_{k-1})$ represents a collection of k party groups executing permutation processing.

$[x]$ represents a (k,n)-secret sharing value of the plane text $x \in G$. Here, G represents a commutative group. The (k,n)-secret sharing value represents a set obtained by collecting all shares which are obtained by distributing the plain text x by the (k,n)-secret sharing. Secret sharing values [x] are normally possessed in a manner to be distributed in n party collection P, so that all secret sharing values [x] are not possessed at one place and therefore, secret sharing values [x] are virtual.

$[x]^{ID}$ represents a secret sharing value, which can express in kinds of IDs, in a space.

$[x]^O$ represents a secret sharing value, which can express m kinds of order collections, in a space.

$[x]^B$ represents a secret sharing value of a bit.

$[x]^V$ represents a secret sharing value, which can express a value of a sorting object, in a space.

$[x]^K$ represents a secret sharing value, which can express a part of keys for determining a sorting order, in a space. The whole key space is expressed by a combination of L pieces of $[x]^K$ (a case where $[x]^K$ is a secret sharing value in a bit column and the key has L bits, for example).

«x»$^P$ represents an additive secret sharing value of the plain text $x \in G$. The additive secret sharing value represents a set obtained by collecting all shares which are obtained by distributing the plain text x by additive secret sharing.

«x»$^P_p$ represents a share possessed by the party $p \in \rho$ in the additive secret sharing value «x»$^P$.

«$\vec{x}$»$^P$ represents a column of additive secret sharing values by which a column of a plain text becomes $\vec{x}$.

«G»$^P$ represents a collection of the whole of additive secret sharing values in the commutative group G.

<$\pi$> represents a permutation data secret sharing value of permutation data $\pi$.

Embodiments of the present invention will be described in detail below. Here, it should be noted that constituent portions mutually having the same functions are given the same reference numerals in the drawings and duplicate description thereof is omitted.

First Embodiment

Referring to FIG. 1, a configuration example of a secret calculation system according to a first embodiment is described. The secret calculation system includes n ($\geq 2$) pieces of sorting devices $1_1, \ldots, 1_n$ and a network 9. Each of the sorting devices $1_1, \ldots, 1_n$ is connected to the network 9. It is sufficient that the network 9 is configured so that the sorting devices $1_1, \ldots, 1_n$ can communicate with each other and the network 9 may be composed of an internet, a LAN, a WAN, or the like, for example. Further, the sorting devices $1_1, \ldots, 1_n$ do not necessarily have to be able to mutually communicate online via the network 9. For example, such configuration may be employed that information outputted from a certain sorting device $1_i$ ($1 \leq i \leq n$) is stored in a portable recording medium such as a USB memory and is inputted offline into another sorting device $1_j$ ($1 \leq j \leq n$, $i \neq j$) from the portable recording medium.

Figure 2:
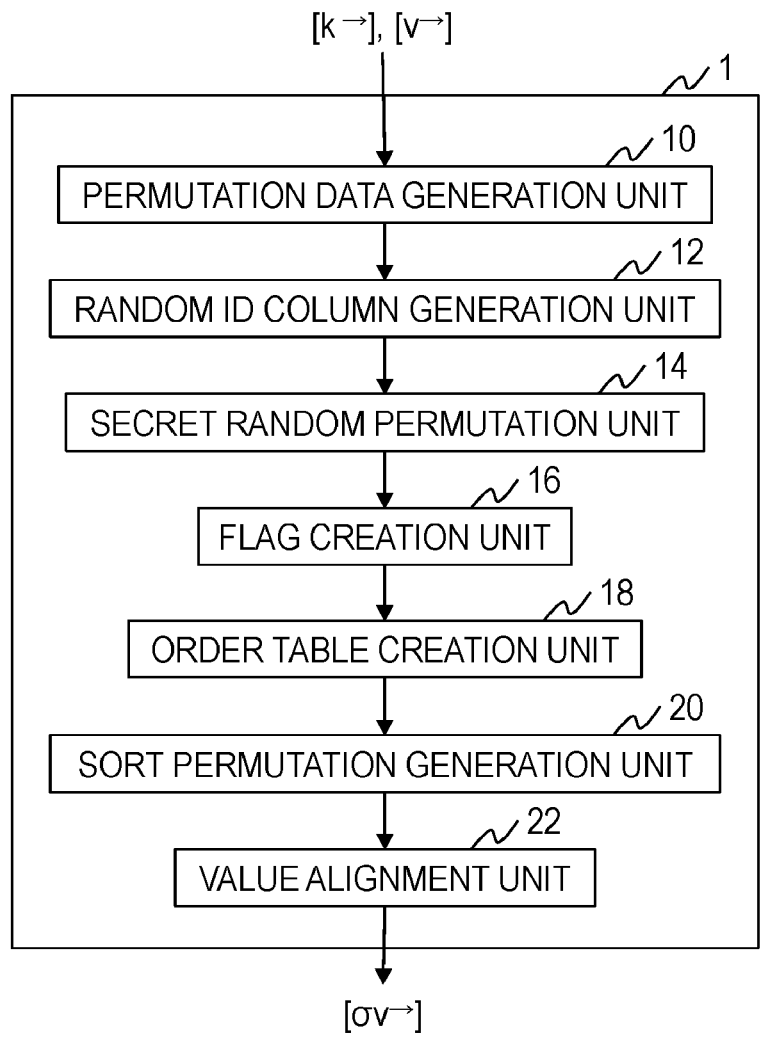
FIG. 2 illustrates the functional configuration of a sorting device according to a first embodiment.

A configuration example of the sorting device 1 included in the secret calculation system is described with reference to FIG. 2. A sorting device 1 includes a permutation data generation unit 10, a random ID column generation unit 12, a secret random permutation unit 14, a flag creation unit 16, an order table creation unit 18, a sort permutation generation unit 20, and a value alignment unit 22. The sorting device 1 is a special device which is configured by reading a special program into a known or dedicated computer including a central processing unit (CPU), a main storage device (a random access memory, RAM), and the like, for example. The sorting device 1 executes each processing under the control of the central processing unit, for example. Data inputted into the sorting device 1 and data obtained in each processing are stored in the main storage device, for example, and the data stored in the main storage device is read when needed so as to be used for other processing.

Figure 3:
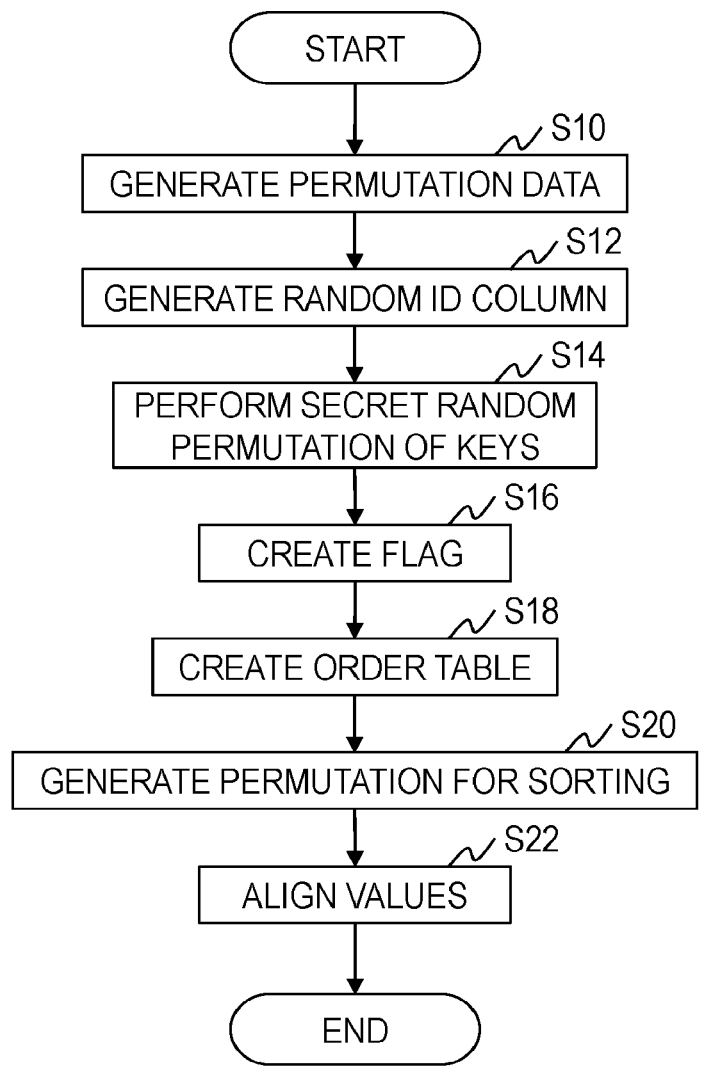
FIG. 3 illustrates a processing flow of a secret calculation method according to the first embodiment.

Referring to FIG. 3, one example of a processing flow of a secret calculation method which is executed by the secret calculation system according to the first embodiment is described in accordance with an order of a procedure which is actually performed.

The sorting device 1 inputs a set ($[\vec{k}]^K, [\vec{v}]^V$) composed of the secret sharing value $[\vec{k}]^K$ of the key column $\vec{k}$ and the secret sharing value $[\vec{v}]^V$ of the value column $\vec{v}$ and outputs the secret sharing value $[\sigma\vec{v}]^V$ of the post-alignment value column $\sigma\vec{v}$. Here, $\sigma$ represents a permutation function representing sorting. The key column $\vec{k}$ is a column including in pieces of keys $k_0, \ldots, k_{m-1}$. The bit length of each key $k_i$ is L. That is, each key $k_i$ can be expressed as $k_i=(k_{i,0}, \ldots, k_{i,L-1})$. Columns of distributed values of respective bits of the key column $\vec{k}$ are expressed as $[\vec{k}_0]^K, \ldots, [\vec{k}_{L-1}]^K$. The value column $\vec{v}$ represents a column including m pieces of values $v_0, \ldots, v_{m-1}$. Each value $v_i$ is at least one value or may be a combination of a plurality of values. The key column $\vec{k}$ and the value column $\vec{v}$ may be identical to each other.

In step S10, the permutation data generation unit 10 parallelly and simultaneously generates permutation data <$\pi_i$> and <$\pi'_i$> with respect to i=0, ..., L-1. Subsequently, permutation data <$\pi_L$> is generated.

In step S12, the random ID column generation unit 12 parallelly and simultaneously generates the random ID column $[\vec{r}_i]^{ID}$ which does not include mutually-overlapped values with respect to i=0, . . . , L−1. Subsequently, the random ID column $[\vec{r}]^{ID}$ which does not mutually include overlapped values.

In step S14, the secret random permutation unit 14 parallelly and simultaneously performs secret random permutation of the set $([\vec{r}_{i-1}]^{ID},[\vec{k}_i]^K,[\vec{r}_i]^{ID})$ composed of the random ID column $[\vec{r}_{i-1}]^{ID}$, the key column $[\vec{k}_i]^K$, and the random ID column $[\vec{r}_i]^{ID}$ by the permutation data $\langle\pi_i\rangle$ with respect to i=1, . . . , L−1 so as to generate the set $(\pi_i\vec{r}_{i-1}, [\pi_i\vec{k}_i]^K,[\pi_i\vec{r}_i]^{ID})$ composed of the post-permutation random ID column $\pi_i\vec{r}_{i-1}$, the post-permutation key column $[\pi_i\vec{k}_i]^K$, and the post-permutation random ID column $[\pi_i\vec{r}_i]^{ID}$. Subsequently, secret random permutation of the random ID column $[\vec{r}_{L-1}]^{ID}$ is performed with the permutation data $\langle\pi_L\rangle$ so as to generate the post-permutation random ID column $\pi_L\vec{r}_{L-1}$.

As the method of the secret random permutation, arbitrary secret random permutation can be employed. For example, the method described in Reference Literature 1 below can be employed. Further, permutation performed by a permutation circuit is applicable as well.

[Reference Literature 1] Koki Hamada, Dai Ikarashi, Koji Chida, Katsumi Takahashi, "A Random Permutation Protocol on Three-Party Secure Function Evaluation", Computer Security Symposium 2010, 2010

Further, the secret random permutation can be also performed by using 1-additive re-sharing protocol described below. The 1-additive re-sharing protocol is secret random permutation in which data processing is performed in accordance with the following procedures with an input of secret sharing values «a»$^\rho$∈«G»$^\rho$ which are possessed by the k party group $\rho=p_0, \ldots, p_{k-1}$ so as to output secret sharing values «a»$^{\rho'}$∈«G»$^{\rho'}$ which are possessed by another k party group $\rho'=p_1, \ldots, p_k$. In the 1-additive re-sharing protocol, only one party is different between the k party group $\rho$ and the k party group $\rho'$, so that the communication volume and the number of communication stages can be reduced and thus, the secret random permutation can be performed effectively. However, it should be noted that roles of the parties are appropriately changed.

First, the party $p_0$ shares the random number $r_i \in G$ with the party $p_i$ with respect to i=1, . . . , k−1. Then, the party $p_0$ calculates the secret sharing value «a»$^{\rho'}_{pk}$ with the following formula so as to send the «a»$^{\rho'}_{pk}$ to the party $p_k$.

$$\langle\langle a \rangle\rangle^{\rho'}_{p_k} = \langle\langle a \rangle\rangle^{\rho}_{p_0} - \sum_{1 \le i < k} r_i$$

The party $p_k$ outputs the received «a»$^{\rho'}_{pk}$. The party $p_i$ (i=1, . . . , k−1) calculates the secret sharing value «a»$^{\rho'}_{pi}$ with the following formula so as to output the secret sharing value «a»$^{\rho'}_{pi}$.

$$\langle\langle a \rangle\rangle^{\rho'}_{p_i} = \langle\langle a \rangle\rangle^{\rho}_{p_i} + r_i$$

In step S16, the flag creation unit 16 determines whether or not $k_j=h$ is satisfied with respect to the key $[\vec{k}_j]^K=([k_{j,0}]^B, \ldots, [k_{j,L-1}]^B)$ in the cases of j=0, . . . , m−1 and h=0, . . . , L−1 so as to parallelly and simultaneously set the flag $[f_{j,h}]$. Specifically, in the case of $k_j=h$, the flag $[f_{j,h}]^B=[1]^B$ is set. In the case of $k_j \ne h$, the flag $[f_{j,h}]^B=[0]^B$ is set. An equal sign determination circuit may be used for setting of a flag.

Subsequently, the flag creation unit 16 converts the flag $[f_{j,h}]^B$ into the flag $[f_{j,h}]^O$. As a method for converting the secret sharing value $[a]^B$ of the value a into the secret sharing value $[a]^O$, the conversion may be performed as follows in the case of secret sharing in which $[a]^B$ includes $Z_2$ as a partial group (for example, reproduction secret sharing of mod 2, Shamir secret sharing on an extension field of 2, or the like). First, the party $p_i$ generates the random number $r_i$ so as to generate the secret sharing values $[r_i]^B$ and $[r_i]^O$ by two types of secret sharing. Then, the following formulas are calculated by secret calculation so as to generate the secret sharing values $[r]^B$ and $[r]^O$ of the random number r.

$$[r]^B := \oplus_{i<n}[r_i]^B,$$

$$[r]^O := \oplus_{i<n}[r_i]^O$$

Subsequently, the exclusive OR $[a'=a \text{ XOR } r]^B$ of the value a and the value r is calculated by using the secret sharing value $[a]^B$ and the secret sharing value $[r]^B$ so as to restore the value a'. Then, the exclusive OR $[a]^O = a' \text{ XOR } [r]^O$ of the value a' and the secret sharing value $[r]^O$ is calculated. That is, in the case of a XOR r=0, $[a]^O := [r]^O$ is obtained. In the case of a XOR r=1, $[a]^O := 1-[r]^O$ is obtained.

In step S18, the order table creation unit 18 creates the order table $[\vec{s}]^O$ by using the flag $[f_{j,h}]^O$. $[S]^O=[0]^O$ is first set. Then, $[s_{j,h}]^O = [S_{j,h-1}]^O + [f_{j,h}]^O$ (here, each integer satisfying $0 \le h < 2^L$) is set with respect to j=0, . . . , m−1. Subsequently, the following formula is parallelly and simultaneously calculated with respect to j=0, . . . , m−1 so as to set the order table $[\vec{s} := (s_0, \ldots, s_{m-1})]^O$. The created order table $[\vec{s}]^O$ becomes a vector in which an order of each element of the key column $\vec{k}=k_0, \ldots, k_{m-1}$ in an ascending order is set.

$$[s_j]^O = \sum_{h<L}[s_{j,h}]^O[f_{j,h}]^O$$

In step S20, the sort permutation generation unit 20 generates the sort permutation $\sigma\pi^{-1}_L$ by using the order table $[\vec{s}]^O$, the random ID column $[\vec{r}_i]$, the permutation data $\langle\pi'_i\rangle$, the post-permutation key column $[\pi_i\vec{k}'_i]^K$, and the post-permutation random ID column $[\sigma_i\vec{r}_i]^{ID}$. The permutation function $\sigma_0=I$ is first set. Here, I represents identical permutation. Then, permutation of the random ID column $[\vec{r}_i]^{ID}$ is performed by the permutation function $\sigma_i$ with respect to i=0, . . . , L−1 so as to generate the post-permutation random ID column $[\sigma_i\vec{r}_i]^{ID}$. Subsequently, secret random permutation of the order table $[\vec{s}]^O$ and the post-permutation random ID column $[\sigma_i\vec{r}_i]^{ID}$ performed with the permutation data $\langle\pi'_i\rangle$ so as to generate the post-permutation order table $\pi'_i\vec{s}$ and the post-permutation random ID column $\pi'_i\sigma_i\vec{r}_i$. Then, alignment of the post-permutation random ID column $\pi'_i\sigma_i\vec{r}_i$ is performed based on the post-permutation order table $\pi'_i\vec{s}$ so as to generate the post-alignment random ID column $\sigma_{i+1}\vec{r}_i$. Here, the permutation function is expressed as $\sigma_{i+1}=\vec{s}^{-1}\sigma_i$. Further, the set $(\pi_{i+1}\vec{r}_i, [\pi_{i+1}\vec{k}_{i+1}]^K, [\pi_{i+1}\vec{r}_{i+1}]^{ID})$ composed of the post-permutation random ID column $\pi_{i+1}\vec{r}_i$, the post-permutation key column $[\pi_{i+1}\vec{k}_{i+1}]^K$, and the post-permutation random ID column $[\pi_{i+1}\vec{r}_{i+1}]^{ID}$ and the post-alignment random ID column $\sigma_{i+1}\vec{r}_i$ are equally coupled with each other by using the post-permutation random ID column $\pi_{i+1}\vec{r}_i$ as a key with respect to i=0, . . . , L−2 so as to generate the set $(\sigma_{i+1}\vec{r}_i, [\sigma_{i+1}\vec{k}_{i+1}]^K, [\sigma_{i+1}\vec{r}_{i+1}]^{ID})$ composed of the post-alignment random ID column $\sigma_{i+1}\vec{r}_i$, the post-alignment key column $[\sigma_{i+1}\vec{k}_{i+1}]^K$, and the post-alignment random ID column $[\sigma_{i+1}\vec{r}_{i+1}]^{ID}$. Subsequently, the post-permutation random ID column $\pi_L\vec{r}_{L-1}$ and the post-alignment random ID column $\sigma_L\vec{r}_{L-1}$ are equally coupled with each other so as to generate the sort permutation $\sigma\pi_L^-$. Here, a permutation function is expressed as $\sigma=\sigma_L$.

In step S22, the value alignment unit 22 performs secret random permutation of the value column $[\vec{v}]^V$ by the permutation data $\langle\pi_L\rangle$ so as to generate the post-permutation value column $[\pi_L\vec{v}]^V$. Subsequently, alignment of the post-permutation value column $[\pi_L\vec{v}]^V$ is performed based on the sort permutation $\sigma\pi_L^{-1}$ so as to generate the post-alignment value column $[\sigma\vec{v}]$.

In the conventional secret sorting technique, generation of a random ID column and secret random permutation have been performed in sequence. In the secret calculation system according to the first embodiment, required pieces of random ID columns are first generated so as to be able to parallelly and simultaneously perform the secret random permutation using the random ID columns. Further, flags required for creation of an order table are parallelly and simultaneously created. Accordingly, the number of communication stages in secret sorting can be reduced and secret calculation including secret sorting can be executed at high speed.

Second Embodiment

Figure 4:
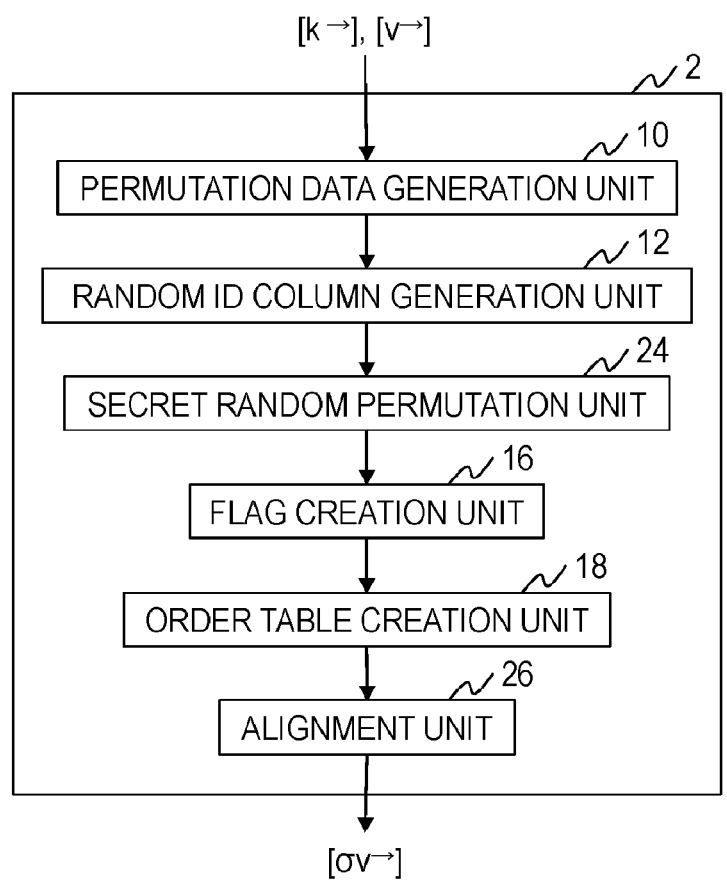
FIG. 4 illustrates the functional configuration of a sorting device according to a second embodiment.

A configuration example of a sorting device 2 according to a second embodiment is described with reference to FIG. 4. The sorting device 2 includes the permutation data generation unit 10, the random ID column generation unit 12, the flag creation unit 16, and the order table creation unit 18 in a similar manner to the sorting device 1 according to the first embodiment, and further includes a secret random permutation unit 24 and an alignment unit 26.

Figure 5:
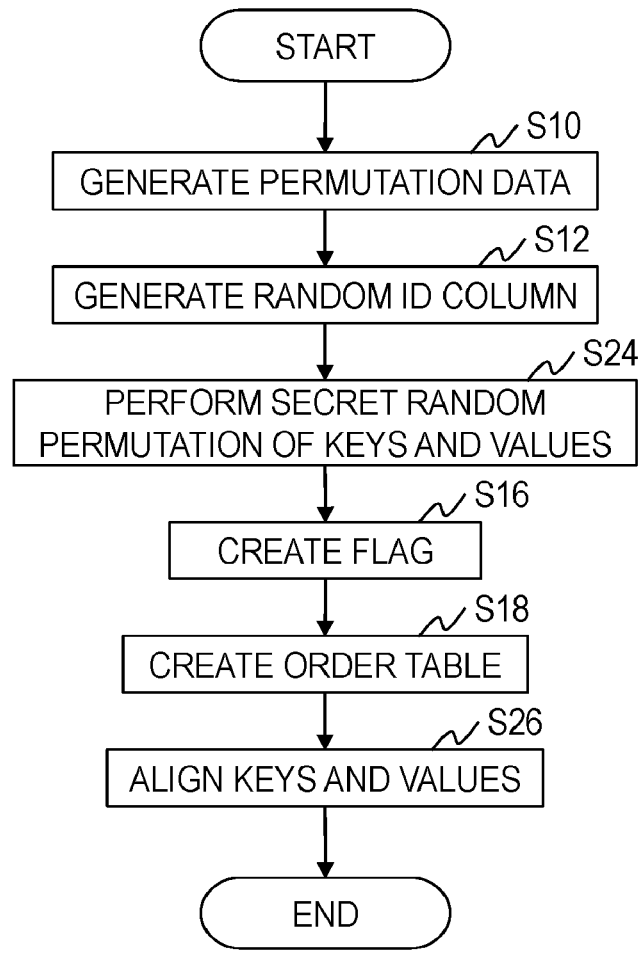
FIG. 5 illustrates a processing flow of a secret calculation method according to the second embodiment.

Referring to FIG. 5, one example of a processing flow of a secret calculation method which is executed by a secret calculation system according to the second embodiment is described in accordance with an order of a procedure which is actually performed.

Processing from step S10 to step S12 is same as that in the secret calculation method according to the first embodiment.

In step S24, the secret random permutation unit 24 parallelly and simultaneously performs secret random permutation of the set $([\vec{r}_{i-1}]^{ID},[\vec{k}_i]^K,[\vec{r}_i]^{ID})$ composed of the random ID column $[\vec{r}_{i-1}]^{ID}$, the key column $[\vec{k}_i]^K$, and the random ID column $[\vec{r}_i]^{ID}$ with the permutation data $\langle\pi_i\rangle$ with respect to $i=1, \ldots, L-1$ so as to generate the set $(\pi_i\vec{r}_{i-1},[\pi_i\vec{k}_i]^K,[\pi_i\vec{r}_i]^{ID})$ composed of the post-permutation random ID column $\pi_i\vec{r}_{i-1}$, the post-permutation key column $[\pi_i\vec{k}_i]^K$, and the post-permutation random ID column $[\pi_i\vec{r}_i]^{ID}$. Subsequently, secret random permutation of the set $([\vec{r}_{L-1}]^{ID},[\vec{v}]^V)$ composed of the random ID column $[\vec{r}_{L-1}]^{ID}$ and the value column $[\vec{v}]^V$ is performed with the permutation data $\langle\pi_L\rangle$ so as to generate the set $(\pi_L\vec{r}_{L-1},[\pi_L\vec{v}]^V)$ composed of the post-permutation random ID column $\pi_L\vec{r}_{L-1}$ and the post-permutation value column $[\pi_L\vec{v}]^V$.

Processing from step S16 to step S18 is same as that of the secret calculation method according to the first embodiment.

In step S26, the alignment unit 26 generates the post-alignment value column $[\sigma\vec{v}]$ by using the order table $[\vec{s}]^O$, the random ID column $[\vec{r}_i]$, the permutation data $\langle\pi'_i\rangle$, the post-permutation key column $[\pi_i\vec{k}_i]^K$, the post-permutation random ID column $[\sigma_i\vec{r}_i]^{ID}$, and the post-permutation value column $[\pi_L\vec{v}]^V$. The permutation function $\sigma_0=I$ is first set. Here, I represents identical permutation. Then, permutation of the random ID column $[\vec{r}_i]^{ID}$ is performed by the permutation function $\sigma_i$ with respect to $i=0, \ldots, L-1$ so as to generate the post-permutation random ID column $[\sigma_i\vec{r}_i]^{ID}$. Subsequently, secret random permutation of the order table $[\vec{s}]^O$ and the post-permutation random ID column $[\sigma_i\vec{r}_i]^{ID}$ is performed with the permutation data $\langle\pi'_i\rangle$ so as to generate the post-permutation order table $\pi'_i\vec{s}$ and the post-permutation random ID column $\pi'_i\sigma_i\vec{r}_i$. Then, alignment of the post-permutation random ID column $\pi'_i\sigma_i\vec{r}_i$ is performed based on the post-permutation order table $\pi'_i\vec{s}$ so as to generate the post-alignment random ID column $\sigma_{i+1}\vec{r}_i$. Here, the permutation function is expressed as $\sigma_{i+1}=s^{-1}\sigma_i$. Further, the set $(\pi_{i+1}\vec{r}_i, [\pi_{i+1}\vec{k}_{i+1}]^K, [\pi_{i+1}\vec{r}_{i+1}]^{ID})$ composed of the post-permutation random ID column $\pi_{i+1}\vec{r}_i$, the post-permutation key column $[\pi_{i+1}\vec{k}_{i+1}]^K$, and the post-permutation random ID column $[\pi_{i+1}\vec{r}_{i+1}]^{ID}$ and the post-alignment random ID column $\sigma_{i+1}\vec{r}_i$ are equally coupled with each other by using the post-permutation random ID column $\pi_{i+1}\vec{r}_i$ as a key with respect to $i=0, \ldots, L-2$ so as to generate the set $(\sigma_{i+1}\vec{r}_i, [\sigma_{i+1}\vec{k}_{i+1}]^K, [\sigma_{i+1}\vec{r}_{i+1}]^{ID})$ composed of the post-alignment random ID column $\sigma_{i+1}\vec{r}_i$, the post-alignment key column $[\sigma_{i+1}\vec{k}_{i+1}]^K$, and the post-alignment random ID column $[\sigma_{i+1}\vec{r}_{i+1}]^{ID}$. Subsequently, the set $(\pi_L\vec{r}_{L-1}, [\pi_L\vec{v}]^V)$ composed of the post-permutation random ID column $\pi_L\vec{r}_{L-1}$ and the post-permutation value column $[\pi_L\vec{v}]^V$ and the post-alignment random ID column $\sigma_L\vec{r}_{L-1}$ are equally coupled with each other by using the post-permutation random ID column $\pi_L\vec{r}_{L-1}$ as a key so as to generate the post-alignment value column $[\sigma\vec{v}]^V$. Here, a permutation function is expressed as $\sigma=\sigma_L$.

In the secret calculation system according to the first embodiment, the processing for generating the sort permutation $\sigma\pi_L^{-1}$ based on the key column $[\vec{k}]^K$ and the processing for obtaining the post-alignment value column $[\sigma\vec{v}]^V$ based on the sort permutation $\sigma\pi_L^{-1}$ are separated from each other. According to such configuration, processing by the value alignment unit can be omitted in the case where the key column $\vec{k}$ and the value column $\vec{v}$ are identical to each other and only the key column $\vec{k}$ is desired to be sorted, for example. In the secret calculation system according to the second embodiment, the secret random permutation unit simultaneously performs secret random permutation of the value column $[\vec{v}]^V$ with the permutation data $\langle\pi_L\rangle$ which is the same data for the random ID column $[\vec{r}_{L-1}]^{ID}$. Therefore, the number of communication stages can be further reduced in the case where both of the key column $\vec{k}$ and the value column $\vec{v}$ are desired to be sorted.

Third Embodiment

Figure 6:
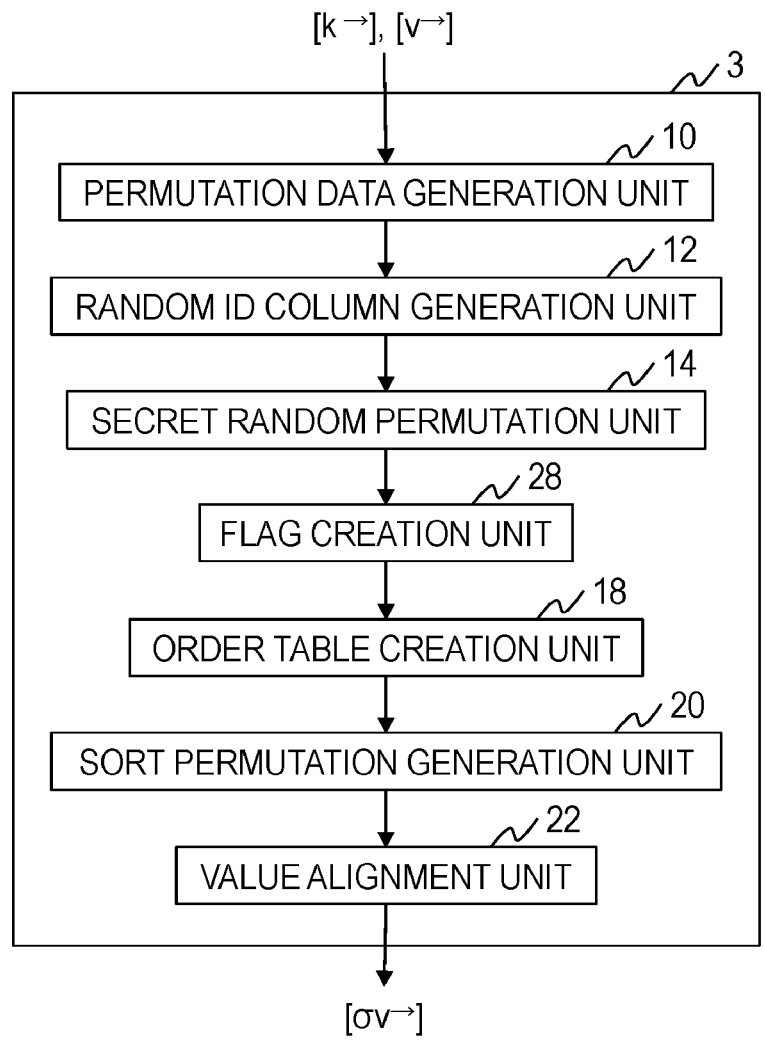
FIG. 6 illustrates the functional configuration of a sorting device according to a third embodiment.

A configuration example of a sorting device 3 according to a third embodiment is described with reference to FIG. 6. The sorting device 3 includes the permutation data generation unit 10, the random ID column generation unit 12, the secret random permutation unit 14, the order table creation unit 18, the sort permutation generation unit 20, and the value alignment unit 22 in a similar manner to the sorting device 1 according to the first embodiment, and further includes a flag creation unit 28. The configuration of the third embodiment is applicable to the second embodiment. That is, such configuration may be employed that the permutation data generation unit 10, the random ID column generation unit 12, the secret random permutation unit 24, the order table creation unit 18, and the alignment unit 26 are included in a similar manner to the sorting device 2 according to the second embodiment, and the flag creation unit 28 is further included.

Figure 7:
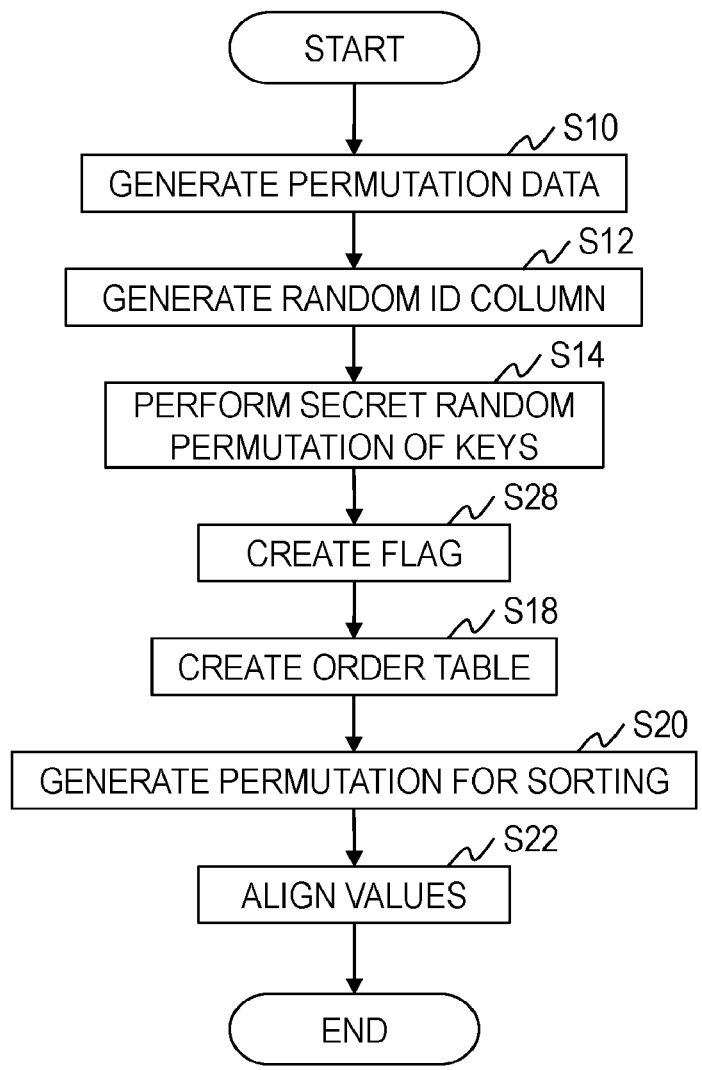
FIG. 7 illustrates a processing flow of a secret calculation method according to the third embodiment.

Referring to FIG. 7, one example of a processing flow of a secret calculation method which is executed by a secret calculation system according to the third embodiment is described in accordance with an order of a procedure which is actually performed.

In the sorting device 1 according to the first embodiment and the sorting device 2 according to the second embodiment, the secret sharing value $[k^{\rightarrow}]^K$ of the key column $k^{\rightarrow}$ to be inputted is a secret sharing value of a bit. That is, the key $[k_j]^K$ can be expressed as the key $[k_j]^K = ([k_{j,0}]^B, \ldots, [k_{j,L-1}]^B)$ with respect to $j=0, \ldots, m-1$. On the other hand, in the sorting device 3 according to the third embodiment, the secret sharing value $[k^{\rightarrow}]^K$ of the key column $k^{\rightarrow}$ to be inputted is a secret sharing value, which can express in kinds of order collections, in a space. That is, the key $[k_j]^K$ can be expressed as the key $[k_j]^K = ([k_{j,0}]^O, \ldots, [k_{j,L-1}]^O)$ with respect to $j=0, \ldots, m-1$.

Processing from step S10 to step S14 is same as that of the secret calculation method according to the first embodiment.

In step S28, the flag creation unit 28 determines whether or not $k_j = h$ is satisfied with respect to the key $[k_j]^K = ([k_{j,0}]^O, \ldots, [k_{j,L-1}]^O)$ in cases of $j=0, \ldots, m-1$ and $h=0, \ldots, L-1$ so as to parallelly and simultaneously set the flag $[f_{j,h}]$. Specifically, in the case of $k_j = h$, the flag $[f_{j,h}]^O = [1]^O$ is set. In the case of $k_j \neq h$, the flag $[f_{j,h}]^O = [0]^O$ is set. An equal sign determination circuit may be used for setting of a flag.

Processing from step S18 to step S22 is same as that of the secret calculation method according to the first embodiment.

In the secret calculation system according to the first embodiment, the flag $[f_{j,h}]^B$ is set from the secret sharing values $[k_{j,0}]^B, \ldots, [k_{j,L-1}]^B$ which are obtained by performing secret sharing of the key $k_j$ for each bit, so that the flag $[f_{j,h}]^B$ needs to be converted into the flag $[f_{j,h}]^O$. In the secret calculation system according to the third embodiment, respective bits of the key $k_j$ are dealt as the secret sharing values $[k_{j,0}]^O, \ldots [k_{j,L-1}]^O$ in a wider space and the flag $[f_{j,h}]^O$ are directly set, so that conversion is not necessary. Accordingly, the configuration is simpler than that in the first embodiment and therefore implementation is easy. However, the calculation amount is larger because the space used for calculation is wider, so that calculation is performed more efficiently in the first embodiment.

Fourth Embodiment

A fourth embodiment enables detection of tampering in secret calculation with respect to secret sorting of this invention. As a secret tampering detection method for detecting tampering in secret calculation, a method described in Reference Literature 2 below is proposed. In Reference Literature 2, tampering detection in secret calculation is performed in three phases. In a randomization phase, a distributed value is converted into a randomized distributed value of which correctness can be verified. In a calculation phase, desired secret calculation is executed by using an operation, which is composed of the semi-honest operation, for a randomized distributed value. At this time, the calculation is performed while collecting randomized distributed values which will be required for calculation of a checksum in the following correctness verification phase. In the correctness verification phase, checksums are collectively calculated with respect to the randomized distributed values which are collected in the calculation phase so as to perform correctness verification. When the checksum is correct, a calculation result obtained in the calculation phase is outputted. When the checksum is incorrect, only the fact of incorrectness is outputted without outputting the calculation result.

[Reference Literature 2] Dai Ikarashi, Koji Chida, Koki Hamada, Ryo Kikuchi, "An Extremely Efficient Secret-sharing-based Multi-Party Computation against Malicious Adversary", SCIS 2013, 2013.

However, in order to apply the method described in Reference Literature 2, each operation executed in secret calculation needs to be tamper-simulatable (Reference Literature 3).

[Reference Literature 3] D. Ikarashi, R. Kikuchi, K. Hamada, and K. Chida, "Actively Private and Correct MPC Scheme in t<n/2 from Passively Secure Schemes with Small Overhead", IACR Cryptology ePrint Archive, vol. 2014, p. 304, 2014

Therefore, in the fourth embodiment, such configuration example is described that the secret tampering detection method described in Reference Literature 2 is applied to secret sorting of the first embodiment so that the above-mentioned condition is satisfied. Here, an example in which the method is applied to the first embodiment is described below, but the method is applicable to the second embodiment and the third embodiment as well based on a similar concept.

Figure 8:
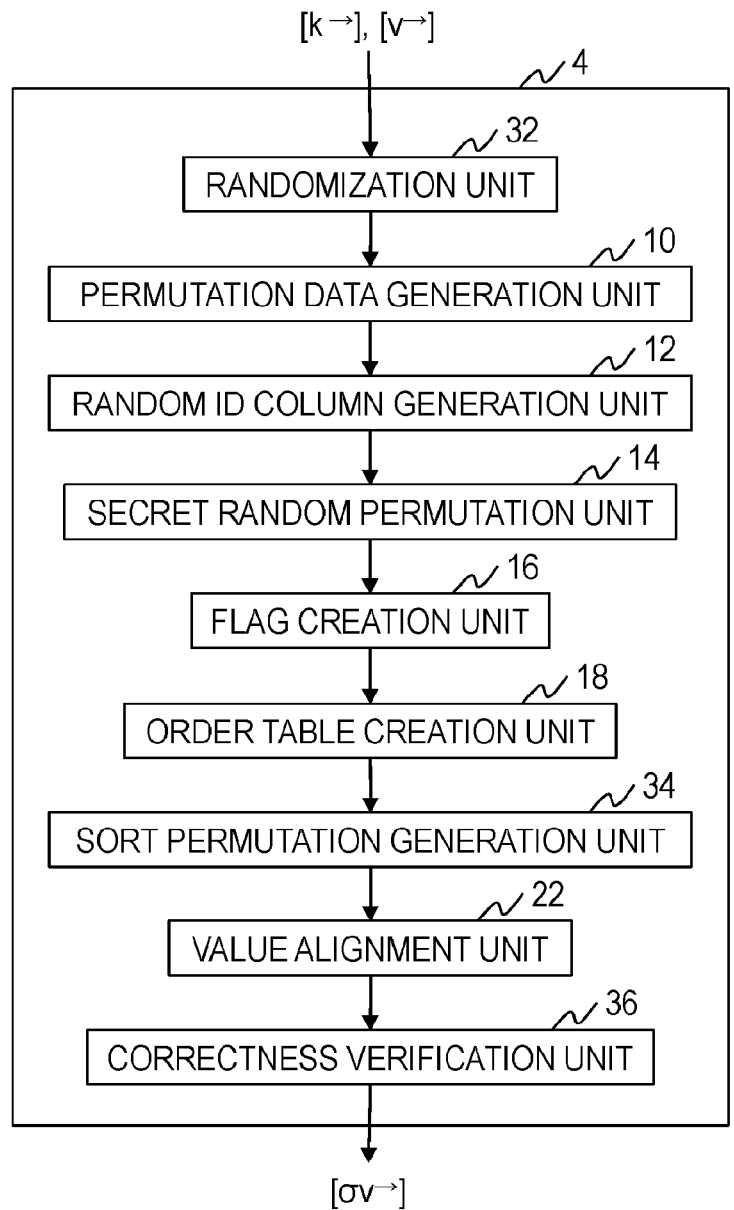
FIG. 8 illustrates the functional configuration of a sorting device according to a fourth embodiment.

A configuration example of a sorting device 4 according to the fourth embodiment is described with reference to FIG. 8. The sorting device 4 includes the permutation data generation unit 10, the random ID column generation unit 12, the secret random permutation unit 14, the flag creation unit 16, the order table creation unit 18, and the value alignment unit 22 in a similar manner to the sorting device 1 according to the first embodiment, and further includes a randomization unit 32, a sort permutation generation unit 34, and a correctness verification unit 36. The configuration of the fourth embodiment is also applicable to the second embodiment and the third embodiment. That is, such configuration may be employed that the randomization unit 32 and the correctness verification unit 36 are further included in addition to the constituent portions provided to the sorting device 2 according to the second embodiment and the sorting device 3 according to the third embodiment and the sort permutation generation unit 34 is included instead of the sort permutation generation unit 20.

Figure 9:
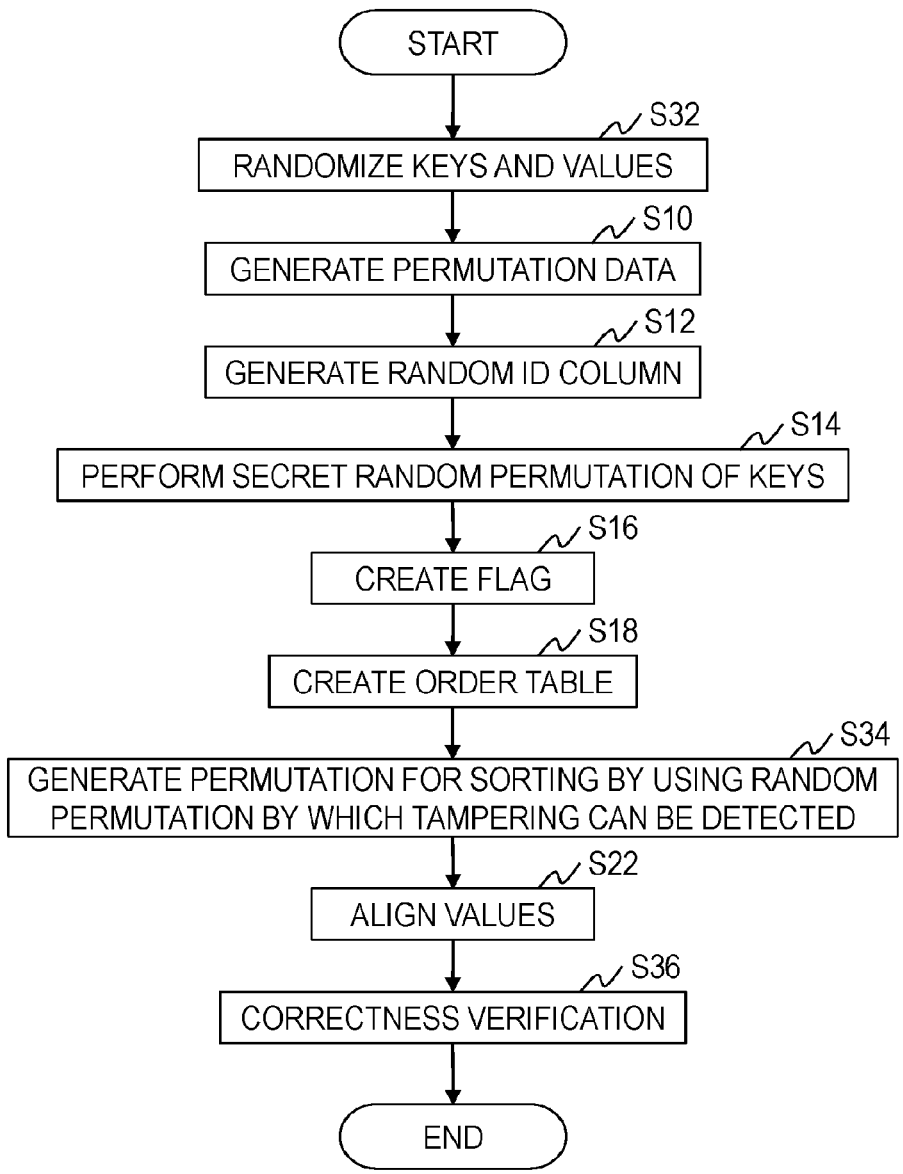
FIG. 9 illustrates a processing flow of a secret calculation method according to the fourth embodiment.

Referring to FIG. 9, one example of a processing flow of a secret calculation method which is executed by the secret calculation system according to the fourth embodiment is described in accordance with an order of a procedure which is actually performed.

In step S32, the randomization unit 32 converts the set $([k^{\rightarrow}]^K, [v^{\rightarrow}]^V)$ composed of the distributed value $[k^{\rightarrow}]^K$ of the inputted key $k^{\rightarrow}$ and the distributed value $[v^{\rightarrow}]^V$ of the value $v^{\rightarrow}$ into a randomized distributed value. The randomized distributed value is the set $([x],[xr])$ composed of the distributed value $[x]$ of the value $x \in R$ and the distributed value $[xr]$ of the integrated value $xr$ of the value $x \in R$ and the random number $r \in A$. Here, R represents a ring and A represents an associative algebra on the ring R. The associative algebra is a joined ring and has a structure in a linear space on a certain field compatible with the ring. The associative algebra can be described such that a value dealt in a vector space may be a ring instead of a field. The 0th component $([x])$ of the randomized distributed value is also referred to as the R component and the first component $([xr])$ is also referred to as the A component.

A random number used in generation of a randomized distributed value is generated such that a distributed value for one secret sharing is converted into a distributed value for the other secret sharing so as to obtain an identical value of the random number in the case where a plurality of types of secret sharing on one ring are used. In this format conversion as well, tampering detection should be possible or tampering should be impossible. For example, a method which prohibits tampering conversion from replicated secret sharing into linear secret sharing is described in Reference Literature 4 below.

[Reference Literature 4] R. Cramer, I. Damgard, and Y. Ishai, "Share conversion, pseudorandom secret-sharing and applications to secure computation", TCC, Vol. 3378 of Lecture Notes in Computer Science, pp. 342-362, Springer, 2005.

From step S14 to step S18, the secret random permutation unit 14, the flag creation unit 16, and the order table creation unit 18 execute predetermined secret calculation while putting a randomized distributed value which is a calculation object and a randomized distributed value which is a calculation result into a checksum $C_j$ (j=0, ..., J-1; J represents the number of types of secret sharing) which is prepared for each type of secret sharing.

In step S34, the sort permutation generation unit 34 uses a secret random permutation method by which tampering can be detected when performing secret random permutation of the order table $[\vec{s}]^O$ and the post-permutation random ID column $[\sigma_i \vec{r}_i]^{ID}$ with the permutation data $<\pi'_i>$. This is because confidentiality may be violated in the case where the order table $[\vec{s}]^O$ and the post-permutation random ID column $[\sigma_i \vec{r}_i]^{ID}$ are tampered. As the random permutation method by which tampering can be detected, in such random permutation method that a (k,n)-secret sharing value is converted into an additive secret sharing value and permutation and re-sharing are repeated, for example, an input is converted into a randomized distributed value, a randomized distributed value is converted from an additive secret sharing value into a (k,n)-secret sharing value so as to be put into a checksum whenever one permutation is ended, and correctness verification similar to step S36 below is performed after the whole repeated permutation is ended. Here, it is possible to repeat the acquisition of a checksum and the correctness verification at arbitrary timing in the random permutation. At this time, it is sufficient to generate a randomized distributed value at least once with respect to an input.

In step S36, the correctness verification unit 36 executes synchronous processing (SYNC) in which an action of waiting is performed until all secret calculations for all secret sharing are ended. When the end of all secret calculations for all secret sharing is detected, the checksums $C_0, \ldots, C_{J-1}$ are verified by using the distributed values $[r_0], \ldots, [r_{J-1}]$ of the random values $r_0, \ldots, r_{J-1}$ which are used in the randomization unit 32 so as to verify correctness of the post-alignment value column $[\vec{ov}]^V$ which is obtained as a result of secret sorting. In the case where it is determined that there is no tampering as a result of the verification of all of J pieces of checksums $C_0, \ldots, C_{J-1}$, the post-alignment value column $[\vec{ov}]^V$ is outputted. In the case where it is determined that there is tampering, information representing the presence of tampering (for example, "⊥" or the like) is outputted.

In the verification of a checksum, the distributed value $[\varphi_j]$ obtained by multiplying a sum of the R components of randomized distributed values included in the checksum $C_j$ by the distributed value $[r_j]$ and the distributed value $[\psi_j]$ which is a sum of the A components of randomized distributed values included in the checksum $C_j$ are calculated and the distributed value $[\delta_j]=[\varphi_j]-[\psi_j]$ obtained by subtracting the distributed value $[\psi_j]$ from the distributed value $[\varphi_j]$ is restored. When all of the values $\delta_0, \ldots, \delta_{J-1}$ are 0, it is determined that there is no tampering in the whole secret sorting. When any value $\delta_j$ is not 0, it is determined that tampering is performed in any operation in the secret sorting.

In the case where there are pieces of secret sharing on one ring among J pieces of secret sharing, if correctness verification is performed collectively to the extent possible, the number of disclosed values is reduced and consequently confidentiality can be further enhanced. For example, in the case where the α-th (α=0, ..., J-1) secret sharing and the β-th (β=0, ..., J-1, α≠β) secret sharing are pieces of secret sharing on one ring, the correctness verification is performed as follows. First, the distributed value $[\varphi_\alpha]$ which is calculated from the checksum $C_\alpha$ as described above and the distributed value $[\psi_\alpha]$ which is calculated from the checksum $C_\alpha$ as described above are respectively converted into the β-th secret sharing. Then, the distributed value $[\delta]=([\varphi_\alpha]+[\varphi_\beta])-([\psi_\alpha]+[\psi_\beta])$ which is obtained by subtracting the distributed value $[\psi_\alpha+\psi_\beta]$ which is obtained by adding the converted distributed value $[\psi_\alpha]$ and the distributed value $[\psi_\beta]$ which is calculated from the β-th checksum $C_\beta$ in a similar manner from the distributed value $[\varphi_\alpha+\varphi_\beta]$ which is obtained by adding the converted distributed value $[\varphi_\alpha]$ and the distributed value $[\varphi_\beta]$ which is calculated from the checksum $C_\beta$ in a similar manner is restored. When the restored value δ is 0, it is determined that there is no tampering. When the restored value δ is other than 0, it is determined that there is tampering. Thus, all combinations of pieces of secret sharing on one ring are verified so as to verify that there is no tampering in the whole secret sorting. The example in which two pieces of secret sharing are secret sharing on one ring is described in the present embodiment. However, correctness verification can be performed by a similar method even in the case where three or more pieces of secret sharing are secret sharing on one ring.

The configuration as that of the present embodiment enables tampering detection and enhances security in the secret sorting of the present invention.

It is obvious that the present invention is not limited to the above-described embodiments and alterations can be made as appropriate within a scope of the idea of the present invention. Various types of processing which are described in the above embodiments may be executed in time series in accordance with the described order and may be executed in parallel or individually in accordance with the processing capacity of the device performing the processing or in accordance with the need.

[Program and Recording Medium]

When various types of processing functions in the devices described in the above embodiments are implemented on a computer, the contents of processing function to be contained in each device is written by a program. With this program executed on the computer, various types of processing functions in the above-described devices are executed on the computer.

This program in which the contents of processing are written can be recorded in a computer-readable recording medium. The computer-readable recording medium may be any medium such as a magnetic recording device, an optical disc, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program stored in a portable recording medium or transferred from a server computer once in a storage unit of the computer, for example. When the processing is performed, the computer reads out the program stored in the recording medium of the computer and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, what is called application service provider (ASP) type of services may be used to perform the processing described above, with which the program is not transferred from the server computer to the computer and the processing function is realized only with execution instructions and result acquisition. It should be noted that a program according to the present embodiment includes information provided for processing performed by electronic calculation equipment, which is equivalent to a program (such as data which is not a direct instruction to the computer but has a property specifying the processing performed by the computer).

In the present embodiment, the present device is configured with a predetermined program executed on a computer. However, the present device may be configured with at least part of these processing contents realized in a hardware manner.

What is claimed is:

1. A secret calculation method, implemented by each of a plurality of sorting devices connected to each other over a network, the secret calculation method being a technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, and in which sort permutation $\sigma\pi^{-1}_L$ for performing alignment of a value column $\vec{v}$ is generated by inputting a set composed of a secret sharing value $[\vec{k}]$ of a column $\vec{k}$ including m pieces of keys $k_0, \ldots, k_{m-1}$ having L bits and a secret sharing value $[\vec{v}]$ of the column $\vec{v}$ including m pieces of electronic plain text values $v_0, \ldots, v_{m-1}$, the method comprising:

receiving as an input, by each of the plurality of sorting devices, a different secret sharing value $[\vec{k}]$ and a different secret sharing value $[\vec{v}]$;

a permutation data generation step in which a permutation data generation unit generates permutation data $<\pi_i>$ and $<\pi^1_i>$ so as to generate permutation data $<\pi_L>$ with respect to i=1, ..., L-1;

a random ID column generation step in which a random ID column generation unit generates a random ID column $[\vec{r}_i]$ which does not include mutually-overlapped values so as to generate a random ID column $[\vec{r}_L]$ which does not include mutually-overlapped values with respect to i=1, ..., L-1;

a secret random permutation step in which a secret random permutation unit performs secret random permutation of a set composed of a random ID column $[\vec{r}_{i-1}]$, a key column $[\vec{k}_i]$, and the random ID column $[\vec{r}_i]$ with the permutation data $<\pi_i>$ so as to generate a set composed of a post-permutation random ID column $\pi_i\vec{r}_{i-1}$, a post-permutation key column $[\pi_i\vec{k}_i]$, and a post-permutation random ID column $[\pi_i\vec{r}_i]$ and performs secret random permutation of a random ID column $[\vec{r}_{L-1}]$ with the permutation data $<\pi_L>$ so as to generate a post-permutation random ID column $\pi_L\vec{r}_{L-1}$ with respect to i=1, ..., L-1, wherein the secret random permutation is performed after all the random ID columns have been generated with respect to i=1, ..., L-1 so as to parallelly and simultaneously perform the secret random permutation using the random ID columns;

a flag creation step in which a flag creation unit determines whether or not $k_j$=h is satisfied with respect to a key $[k_j]=([k_{j,0}], \ldots, [k_{j,L-1}])$ in cases of j=0, ..., m-1 and h=0, ..., L-1 so as to set a flag $[f_{j,h}]$;

an order table creation step in which an order table creation unit creates an order table $[\vec{s}:=(s_0, \ldots, s_{m-1})]$, in which an order of each of the keys $k_0, \ldots, k_{m-1}$ in an ascending order is set, by using the flag $[f_{j,h}]$; and a sort permutation generation step in which a sort permutation generation unit performs permutation of the random ID column $[\vec{r}_i]$ by a permutation function $\sigma_i$ so as to generate a post-permutation random ID column $[\sigma_i\vec{r}_i]$ with respect to i=0, ..., L-1, performs secret random permutation of an order table $[\vec{s}]$ and the post-permutation random ID column $[\sigma_i\vec{r}_i]$ with the permutation data $<\pi'_i>$ so as to generate a post-permutation order table $\pi'_i\vec{s}$ and a post-permutation random ID column $\pi'_i\sigma_i\vec{r}_i$, performs alignment of the post-permutation random ID column $\pi'_i\sigma_i\vec{r}_i$ based on the post-permutation order table $\pi'_i\vec{s}$ so as to generate a post-alignment random ID column $\sigma_{i+1}\vec{r}_i$, sets a permutation function $\sigma_{i+1}=\vec{s}^{-1}\sigma_i$, equally couples a set composed of a post-permutation random ID column $\pi_{i+1}\vec{r}_i$, a post-permutation key column $[\pi_{i+1}\vec{k}_{i+1}]$, and a post-permutation random ID column $[\pi_{i+1}\vec{r}_{i+1}]$ with the post-alignment random ID column $\sigma_{i+1}\vec{r}_i$ by using the post-permutation random ID column $\pi_{i+1}\vec{r}_i$ as a key with respect to i=0, ..., L-2, generates a set composed of the post-alignment random ID column $\sigma_{i+1}\vec{r}_i$, a post-alignment key column $[\sigma_{i+1}\vec{k}_{i+1}]$, and a post-alignment random ID column $[\sigma_{i+1}\vec{r}_{i+1}]$, and equally couples the post-permutation random ID column $\pi_L\vec{r}_{L-1}$ with a post-alignment random ID column $\sigma_L\vec{r}_{L-1}$ so as to generate sort permutation $\sigma\pi^{-1}_L$.

2. A secret calculation method, implemented by each of a plurality of sorting devices connected to each other over a network, the secret calculation method being a technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, and in which a post-alignment value column $[\sigma\vec{v}]^V$, the post-alignment value column $[\sigma\vec{v}]^V$ being obtained by performing alignment of a value column $\vec{v}$, is generated by inputting a set composed of a secret sharing value $[\vec{k}]$ of a column $\vec{k}$ including m pieces of keys $k_0, \ldots, k_{m-1}$ having L bits and a secret sharing value $[\vec{v}]$ of the column $\vec{v}$ including m pieces of electronic plain text values $v_0, \ldots, v_{m-1}$, the method comprising:

receiving as an input, by each of the plurality of sorting devices, a different secret sharing value $[\vec{k}]$ and a different secret sharing value $[\vec{v}]$;

a permutation data generation step in which a permutation data generation unit generates permutation data $\langle\pi_i\rangle$ and $\langle\pi'_i\rangle$ so as to generate permutation data $\langle\pi_L\rangle$ with respect to $i=1, \ldots, L-1$;

a random ID column generation step in which a random ID column generation unit generates a random ID column $[\vec{r}_i]$ which does not include mutually-overlapped values so as to generate a random ID column $[\vec{r}_L]$ which does not include mutually-overlapped values with respect to $i=1, \ldots, L-1$;

a secret random permutation step in which a secret random permutation unit performs secret random permutation of a set composed of a random ID column $[\vec{r}_{i-1}]$, a key column $[\vec{k}_i]$, and the random ID column $[\vec{r}_i]$ with the permutation data $\langle\pi_i\rangle$ so as to generate a set composed of a post-permutation random ID column $\pi_i\vec{r}_{i-1}$, a post-permutation key column $[\pi_i\vec{k}_i]$, and a post-permutation random ID column $[\pi_i\vec{r}_i]$ and performs secret random permutation of a set composed of a random ID column $[\vec{r}_{L-1}]$ and a value column $[\vec{v}]^V$ with the permutation data $\langle\pi_L\rangle$ so as to generate a set composed of a post-permutation random ID column $\pi_L\vec{r}_{L-1}$ and a post-permutation value column $[\pi_L\vec{v}]^V$ with respect to $i=1, \ldots, L-1$;

a flag creation step in which a flag creation unit determines whether or not $k_j=h$ is satisfied with respect to a key $[k_j]=([k_{j,0}], \ldots, [k_{j,L-1}])$ in cases of $j=0, \ldots, m-1$ and $h=0, \ldots, L-1$ so as to set a flag $[f_{j,h}]$;

an order table creation step in which an order table creation unit creates an order table $[\vec{s}:=(s_0, \ldots, s_{m-1})]$, in which an order of each of the keys $k_0, \ldots, k_{m-1}$ in an ascending order is set, by using the flag $[f_{j,h}]$; and an alignment step in which an alignment unit performs permutation of the random ID column $[\vec{r}_i]$ by a permutation function $\sigma_i$ so as to generate a post-permutation random ID column $[\sigma_i\vec{r}_i]$ with respect to $i=0, \ldots, L-1$, performs secret random permutation of an order table $[\vec{s}]$ and the post-permutation random ID column $[\sigma_i\vec{r}_i]$ with the permutation data $\langle\pi'_i\rangle$ so as to generate a post-permutation order table $\pi'_i\vec{s}$ and a post-permutation random ID column $\pi'_i\sigma_i\vec{r}_i$, performs alignment of the post-permutation random ID column $\pi'_i\sigma_i\vec{r}_i$ based on the post-permutation order table $\pi'_i\vec{s}$ so as to generate a post-alignment random ID column $\sigma_{i+1}\vec{r}_i$, sets a permutation function $\sigma_{i+1}=\vec{s}^{-1}\sigma_i$, equally couples a set composed of a post-permutation random ID column $\pi_{i+1}\vec{r}_i$, a post-permutation key column $[\pi_{i+1}\vec{k}_{i+1}]$, and a post-permutation random ID column $[\pi_{i+1}\vec{r}_{i+1}]$ with the post-alignment random ID column $\sigma_{i+1}\vec{r}_i$ by using the post-permutation random ID column $\pi_{i+1}\vec{r}_i$ as a key with respect to $i=0, \ldots, L-2$, generates a set composed of the post-alignment random ID column $\sigma_{i+1}\vec{r}_i$, a post-alignment key column $[\sigma_{i+1}\vec{k}_{i+1}]$, and a post-alignment random ID column $[\sigma_{i+1}\vec{r}_{i+1}]$, and equally couples a set composed of the post-permutation random ID column $\pi_L\vec{r}_{L-1}$ and the post-permutation value column $[\pi_L\vec{v}]^V$ with a post-alignment random ID column $\sigma_L\vec{r}_{L-1}$ by using the post-permutation random ID column $\pi_L\vec{r}_{L-1}$ as a key so as to generate the post-alignment value column $[\sigma\vec{v}]^V$.

3. The secret calculation method according to claim 1, further comprising:

a value alignment step in which a value alignment unit performs secret random permutation of the value column $[\vec{v}]$ with the permutation data $\langle\pi_L\rangle$ so as to generate a post-permutation value column $[\pi_L\vec{v}]$ and performs alignment of the post-permutation value column $[\pi_L\vec{v}]$ based on the sort permutation $\sigma\pi^{-1}_L$ so as to generate a post-alignment value column $[\sigma\vec{v}]$.

4. A secret calculation system, which performs a secret calculation technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, and by which sort permutation $\sigma\pi^{-1}_L$ for performing alignment of a value column $\vec{v}$ is generated by inputting a set composed of a secret sharing value $[\vec{k}]$ of a column $\vec{k}$ including m pieces of keys $k_0, \ldots, k_{m-1}$ having L bits and a secret sharing value $[\vec{v}]$ of the column $\vec{v}$ including m pieces of electronic plain text values $v_0, \ldots, v_{m-1}$, the system comprising:

a plurality of sorting devices, connected to each other over a network, and each configured to receive as an input a different secret sharing value $[\vec{k}]$ and a different secret sharing value $[\vec{v}]$; wherein the sorting devices each include a memory and at least one processor configured to read a program from the memory to generate permutation data $\langle\pi_i\rangle$ and $\langle\pi'_i\rangle$ so as to generate permutation data $\langle\pi_L\rangle$ with respect to $i=1, \ldots, L-1$, generate a random ID column $[\vec{r}_i]$ which does not include mutually-overlapped values so as to generate a random ID column $[\vec{r}_L]$ which does not include mutually-overlapped values with respect to $i=1, \ldots, L-1$, perform secret random permutation of a set composed of a random ID column $[\vec{r}_{i-1}]$, a key column $[\vec{k}_i]$, and the random ID column $[\vec{r}_i]$ with the permutation data $\langle\pi_i\rangle$ so as to generate a set composed of a post-permutation random ID column $\pi_i\vec{r}_{i-1}$, a post-permutation key column $[\pi_i\vec{k}_i]$, and a post-permutation random ID column $[\pi_i\vec{r}_i]$ and perform secret random permutation of a random ID column $[\vec{r}_{L-1}]$ with the permutation data $\langle\pi_L\rangle$ so as to generate a post-permutation random ID column $\pi_L\vec{r}_{L-1}$ with respect to $i=1, \ldots, L-1$, wherein the secret random permutation is performed after all the random ID columns have been generated with respect to $i=1, \ldots, L-1$ so as to parallelly and simultaneously perform the secret random permutation using the random ID columns, determine whether or not $k_j=h$ is satisfied with respect to a key $[k_j]=([k_{j,0}], \ldots, [k_{j,L-1}])$ in cases of $j=0, \ldots, m-1$ and $h=0, \ldots, L-1$ so as to set a flag $[f_{j,h}]$, create an order table $[\vec{s}:=(s_0, \ldots, s_{m-1})]$, in which an order of each of the keys $k_0, \ldots, k_{m-1}$ in an ascending order is set, by using the flag $[f_{j,h}]$, and perform permutation of the random ID column $[\vec{r}_i]$ by a permutation function $\sigma_i$ so as to generate a post-permutation random ID column $[\sigma_i\vec{r}_i]$ with respect to $i=0, \ldots, L-1$, perform secret random permutation of an order table $[\vec{s}]$ and the post-permutation random ID column $[\sigma_i\vec{r}_i]$ with the permutation data $\langle\pi'_i\rangle$ so as to generate a post-permutation order table $\pi'_i\vec{s}$ and a post-permutation random ID column $\pi'_i \sigma_i \vec{r}_i$, perform alignment of the post-permutation random ID column $\pi'_i \sigma_i \vec{r}_i$ based on the post-permutation order table $\pi'_i \vec{s}$ so as to generate a post-alignment random ID column $\sigma_{i+1} \vec{r}_i$, set a permutation function $\sigma_{i+1} = \vec{s}^{-1} \sigma_i$, equally couples a set composed of a post-permutation random ID column $\pi_{i+1} \vec{r}_i$, a post-permutation key column $[\pi_{i+1} \vec{k}_{i+1}]$, and a post-permutation random ID column $[\pi_{i+1} \vec{r}_{i+1}]$ with the post-alignment random ID column $\sigma_{i+1} \vec{r}_i$ by using the post-permutation random ID column $\pi_{i+1} \vec{r}_i$ as a key with respect to $i=0, \ldots, L-2$, generate a set composed of the post-alignment random ID column $\sigma_{i+1} \vec{r}_i$, a post-alignment key column $[\sigma_{i+1} \vec{k}_{i+1}]$, and a post-alignment random ID column $[\sigma_{i+1} \vec{r}_{i+1}]$, and equally couple the post-permutation random ID column $\pi_L \vec{r}_{L-1}$ with a post-alignment random ID column $\sigma_L \vec{r}_{L-1}$ so as to generate sort permutation $\sigma \pi^{-1}_L$.

5. A secret calculation system, which performs a secret calculation technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, and by which a post-alignment value column $[\sigma \vec{v}]$, the post-alignment value column $[\sigma \vec{v}]$ being obtained by performing alignment of a value column $\vec{v}$, is generated by inputting a set composed of a secret sharing value $[\vec{k}]$ of a column $\vec{k}$ including m pieces of keys $k_0, \ldots, k_{m-1}$ having L bits and a secret sharing value $[\vec{v}]$ of the column $\vec{v}$ including m pieces of electronic plain text values $v_0, \ldots, v_{m-1}$, the system comprising:

a plurality of sorting devices, connected to each other over a network, and each configured to receive as an input a different secret sharing value $[\vec{k}]$ and a different secret sharing value $[\vec{v}]$; wherein the sorting devices each include a memory and at least one processor configured to read a program from the memory to generate permutation data $<\pi_i>$ and $<\pi'_i>$ so as to generate permutation data $<\pi_L>$ with respect to $i=1, \ldots, L-1$, generate a random ID column $[\vec{r}_i]$ which does not include mutually-overlapped values so as to generate a random ID column $[\vec{r}_L]$ which does not include mutually-overlapped values with respect to $i=1, \ldots, L-1$, perform secret random permutation of a set composed of a random ID column $[\vec{r}_{i-1}]$, a key column $[\vec{k}_i]$, and the random ID column $[\vec{r}_i]$ with the permutation data $<\pi_i>$ so as to generate a set composed of a post-permutation random ID column $\pi_i \vec{r}_{i-1}$, a post-permutation key column $[\pi_i \vec{k}_i]$, and a post-permutation random ID column $[\pi_i \vec{r}_i]$ and perform secret random permutation of a random ID column $[\vec{r}_{L-1}]$ and a value column $[\vec{v}]^V$ with the permutation data $<\pi_L>$ so as to generate a post-permutation random ID column $\pi_L \vec{r}_{L-1}$ and a post-permutation value column $[\pi_L \vec{v}]^V$ with respect to $i=1, \ldots, L-1$, wherein the secret random permutation is performed after all the random ID columns have been generated with respect to $i=1, \ldots, L-1$ so as to parallelly and simultaneously perform the secret random permutation using the random ID columns, determine whether or not $k_j = h$ is satisfied with respect to a key $[k_j] = ([k_{j,0}], \ldots, [k_{j,L-1}])$ in cases of $j=0, \ldots, m-1$ and $h=0, \ldots, L-1$ so as to set a flag $[f_{j,h}]$, create an order table $[\vec{s} := (s_0, \ldots, s_{m-1})]$, in which an order of each of the keys $k_0, \ldots, k_{m-1}$ in an ascending order is set, by using the flag $[f_{j,h}]$, and perform permutation of the random ID column $[\vec{r}_i]$ by a permutation function $\sigma_i$ so as to generate a post-permutation random ID column $[\sigma_i \vec{r}_i]$ with respect to $i=0, \ldots, L-1$, perform secret random permutation of an order table $[\vec{s}]$ and the post-permutation random ID column $[\sigma_i \vec{r}_i]$ with the permutation data $<\pi'_i>$ so as to generate a post-permutation order table $\pi'_i \vec{s}$ and a post-permutation random ID column $\pi'_i \sigma_i \vec{r}_i$, perform alignment of the post-permutation random ID column $\pi'_i \sigma_i \vec{r}_i$ based on the post-permutation order table $\pi'_i \vec{s}$ so as to generate a post-alignment random ID column $\sigma_{i+1} \vec{r}_i$, set a permutation function $\sigma_{i+1} = \vec{s}^{-1} \sigma_i$, equally couple a set composed of a post-permutation random ID column $\pi_{i+1} \vec{r}_i$, a post-permutation key column $[\pi_{i+1} \vec{k}_{i+1}]$, and a post-permutation random ID column $[\pi_{i+1} \vec{r}_{i+1}]$ with the post-alignment random ID column $\sigma_{i+1} \vec{r}_i$ by using the post-permutation random ID column $\sigma_{i+1} \vec{r}_i$ as a key with respect to $i=0, \ldots, L-2$, generate a set composed of the post-alignment random ID column $\sigma_{i+1} \vec{r}_i$, a post-alignment key column $[\sigma_{i+1} \vec{k}_{i+1}]$, and a post-alignment random ID column $[\sigma_{i+1} \vec{r}_{i+1}]$, and equally couple a set composed of the post-permutation random ID column $\pi_L \vec{r}_{L-1}$ and the post-permutation value column $[\pi_L \vec{v}]^V$ with a post-alignment random ID column $\sigma_L \vec{r}_{L-1}$ by using the post-permutation random ID column $\pi_L \vec{r}_{L-1}$ as a key so as to generate the post-alignment value column $[\sigma \vec{v}]^V$.

6. A sorting device, among a plurality of sorting devices connected over a network in a secret calculation system which performs a secret calculation technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, the sorting device which generates sort permutation $\sigma \pi^{-1}_L$ for performing alignment of a value column $\vec{v}$ by inputting a set composed of a secret sharing value $[\vec{k}]$ of a column $\vec{k}$ including m pieces of keys $k_0, \ldots, k_{m-1}$ having L bits and a secret sharing value $[\vec{v}]$ of the column $\vec{v}$ including m pieces of electronic plain text values $v_0, \ldots, v_{m-1}$, the sorting device comprising:

include a memory and at least one processor configured to read a program from the memory to receive as an input a different secret sharing value $[\vec{k}]$ and a different secret sharing value $[\vec{v}]$ from the other sorting devices;

generate permutation data $<\pi_i>$ and $<\pi'_i>$ so as to generate permutation data $<\pi_L>$ with respect to $i=1, \ldots, L-1$, generate a random ID column $[\vec{r}_i]$ which does not include mutually-overlapped values so as to generate a random ID column $[\vec{r}_L]$ which does not include mutually-overlapped values with respect to $i=1, \ldots, L-1$, perform secret random permutation of a set composed of a random ID column $[\vec{r}_{i-1}]$, a key column $[\vec{k}_i]$, and the random ID column $[\vec{r}_i]$ with the permutation data $<\pi_i>$ so as to generate a set composed of a post-permutation random ID column $\pi_i \vec{r}_{i-1}$, a post-permutation key column $[\pi_i \vec{k}_i]$, and a post-permutation random ID column $[\pi_i \vec{r}_i]$ and perform secret random permutation of a random ID column $[\vec{r}_{L-1}]$ with the permutation data $\langle\pi_L\rangle$ so as to generate a post-permutation random ID column $\pi_L r^\rightarrow_{L-1}$ with respect to i=1, ..., L-1, wherein the secret random permutation is performed after all the random ID columns have been generated with respect to i=1, ..., L-1 so as to parallelly and simultaneously perform the secret random permutation using the random ID columns, determine whether or not $k_j$=h is satisfied with respect to a key $[k_j]=([k_{j,0}], \ldots, [k_{j,L-1}])$ in cases of j=0, ..., m-1 and h=0, ..., L-1 so as to set a flag $[f_{j,h}]$, create an order table $[s^\rightarrow:=(s_0, \ldots, s_{m-1})]$, in which an order of each of the keys $k_0, \ldots, k_{m-1}$ in an ascending order is set, by using the flag $[f_{j,h}]$, and perform permutation of the random ID column $[r^\rightarrow_i]$ by a permutation function $\sigma_i$ so as to generate a post-permutation random ID column $[\sigma_i r^\rightarrow_i]$ with respect to i=0, ..., L-1, perform secret random permutation of an order table $[s^\rightarrow]$ and the post-permutation random ID column $[\sigma_i r^\rightarrow_i]$ with the permutation data $\langle\pi'_i\rangle$ so as to generate a post-permutation order table $\pi'_i s^\rightarrow$ and a post-permutation random ID column $\pi'_i \sigma_i r^\rightarrow_i$, perform alignment of the post-permutation random ID column $\pi'_i \sigma_i r^\rightarrow_i$ based on the post-permutation order table $\pi'_i s^\rightarrow$ so as to generate a post-alignment random ID column $\sigma_{i+1} r^\rightarrow_i$, set a permutation function $\sigma_{i+1}=s^{\rightarrow-1}\sigma_i$, equally couples a set composed of a post-permutation random ID column $\pi_{i+1} r^\rightarrow_i$, a post-permutation key column $[\pi_{i+1} k^\rightarrow_{i+1}]$, and a post-permutation random ID column $[\pi_{i+1} r^\rightarrow_{i+1}]$ with the post-alignment random ID column $\sigma_{i+1} r^\rightarrow_i$ by using the post-permutation random ID column $\pi_{i+1} r^\rightarrow_i$ as a key with respect to i=0, ..., L-2, generate a set composed of the post-alignment random ID column $\sigma_{i+1} r^\rightarrow_i$, a post-alignment key column $[\sigma_{i+1} k^\rightarrow_{i+1}]$, and a post-alignment random ID column $[\sigma_{i+1} r^\rightarrow_{i+1}]$, and equally couple the post-permutation random ID column $\pi_L r^\rightarrow_{L-1}$ with a post-alignment random ID column $\sigma_L r^\rightarrow_{L-1}$ so as to generate sort permutation $\sigma\pi^{-1}_L$.

7. A sorting device, among a plurality of sorting devices connected over a network in a secret calculation system which performs a secret calculation technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, the sorting device which generates a post-alignment value column $[\sigma v^\rightarrow]^V$, the post-alignment value column $[\sigma v^\rightarrow]^V$ being obtained by performing alignment of a value column $v^\rightarrow$, by inputting a set composed of a secret sharing value $[k^\rightarrow]$ of a column $k^\rightarrow$ including m pieces of keys $k_0, \ldots, k_{m-1}$ having L bits and a secret sharing value $[v^\rightarrow]$ of the column $v^\rightarrow$ including m pieces of electronic plain text values $v_0, \ldots, v_{m-1}$, the sorting device comprising:

include a memory and at least one processor configured to read a program from the memory to receive, as an input, the secret sharing value $[k^\rightarrow]$ and the secret sharing value $[v^\rightarrow]$;

generate permutation data $\langle\pi_i\rangle$ and $\langle\pi'_i\rangle$ so as to generate permutation data $\langle\pi_L\rangle$ with respect to i=1, ..., L-1, generate a random ID column $[r^\rightarrow_i]$ which does not include mutually-overlapped values so as to generate a random ID column $[r^\rightarrow_L]$ which does not include mutually-overlapped values with respect to i=1, ..., L-1, perform secret random permutation of a set composed of a random ID column $[r^\rightarrow_{i-1}]$, a key column $[k^\rightarrow_i]$, and the random ID column $[r^\rightarrow_i]$ with the permutation data $\langle\pi_i\rangle$ so as to generate a set composed of a post-permutation random ID column $\pi_i r^\rightarrow_{i-1}$, a post-permutation key column $[\pi_i k^\rightarrow_i]$, and a post-permutation random ID column $[\pi_i r^\rightarrow_i]$ and perform secret random permutation of a random ID column $[r^\rightarrow_{L-1}]$ and a value column $[v^\rightarrow]^V$ with the permutation data $\langle\pi_L\rangle$ so as to generate a post-permutation random ID column $\pi_L r^\rightarrow_{L-1}$ and a post-permutation value column $[\pi_L v^\rightarrow]^V$ with respect to i=1, ..., L-1, wherein the secret random permutation is performed after all the random ID columns have been generated with respect to i=1, ..., L-1 so as to parallelly and simultaneously perform the secret random permutation using the random ID columns, determine whether or not $k_j$=h is satisfied with respect to a key $[k_j]=([k_{j,0}], \ldots, [k_{j,L-1}])$ in cases of j=0, ..., m-1 and h=0, ..., L-1 so as to set a flag $[f_{j,h}]$, create an order table $[s^\rightarrow:=(s_0, \ldots, s_{m-1})]$, in which an order of each of the keys $k_0, \ldots, k_{m-1}$ in an ascending order is set, by using the flag $[f_{j,h}]$, and perform permutation of the random ID column $[r^\rightarrow_i]$ by a permutation function $\sigma_i$ so as to generate a post-permutation random ID column $[\sigma_i r^\rightarrow_i]$ with respect to i=0, ..., L-1, perform secret random permutation of an order table $[s^\rightarrow]$ and the post-permutation random ID column $[\sigma_i r^\rightarrow_i]$ with the permutation data $\langle\pi'_i\rangle$ so as to generate a post-permutation order table $\pi'_i s^\rightarrow$ and a post-permutation random ID column $\pi'_i \sigma_i r^\rightarrow_i$, perform alignment of the post-permutation random ID column $\pi'_i \sigma_i r^\rightarrow_i$ based on the post-permutation order table $\pi'_i s^\rightarrow$ so as to generate a post-alignment random ID column $\sigma_{i+1} r^\rightarrow_i$, set a permutation function $\sigma_{i+1}=s^{\rightarrow-1}\sigma_i$, equally couples a set composed of a post-permutation random ID column $\pi_{i+1} r^\rightarrow_i$, a post-permutation key column $[\pi_{i+1} k^\rightarrow_{i+1}]$, and a post-permutation random ID column $[\pi_{i+1} r^\rightarrow_{i+1}]$ with the post-alignment random ID column $\sigma_{i+1} r^\rightarrow_i$ by using the post-permutation random ID column $\pi_{i+1} r^\rightarrow_i$ as a key with respect to i=0, ..., L-2, generate a set composed of the post-alignment random ID column $\sigma_{i+1} r^\rightarrow_i$, a post-alignment key column $[\sigma_{i+1} k^\rightarrow_{i+1}]$, and a post-alignment random ID column $[\sigma_{i+1} r^\rightarrow_{i+1}]$, and equally couple a set composed of the post-permutation random ID column $\pi_L r^\rightarrow_{L-1}$ and the post-permutation value column $[\pi_L v^\rightarrow]^V$ with a post-alignment random ID column $\sigma_L r^\rightarrow_{L-1}$ by using the post-permutation random ID column $\pi_L r^\rightarrow_{L-1}$ as a key so as to generate the post-alignment value column $[\sigma v^\rightarrow]^V$.

8. A non-transitory computer readable medium including computer executable instructions that make a sorting device, among a plurality of sorting devices connected over a network in a secret calculation system which performs a secret calculation technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, the sorting device which generates sort permutation $\sigma\pi^{-1}_L$ for performing alignment of a value column $v^\rightarrow$ by inputting a set composed of a secret sharing value $[k^\rightarrow]$ of a column $k^\rightarrow$ including m pieces of keys $k_0, \ldots, k_{m-1}$ having L bits and a secret sharing value $[v^\rightarrow]$ of the column $\vec{v}$ including m pieces of electronic plain text values $v_0, \ldots, v_{m-1}$, perform a method, the method comprising:

receiving as an input a different secret sharing value $[\vec{k}]$ and a different secret sharing value $[\vec{v}]$ from the other sorting devices;

generating permutation data $\langle\pi_i\rangle$ and $\langle\pi'_i\rangle$ so as to generate permutation data $\langle\pi_L\rangle$ with respect to $i=1, \ldots, L-1$;

generating a random ID column $[\vec{r}_i]$ which does not include mutually-overlapped values so as to generate a random ID column $[\vec{r}_L]$ which does not include mutually-overlapped values with respect to $i=1, \ldots, L-1$;

performing secret random permutation of a set composed of a random ID column $[\vec{r}_{i-1}]$, a key column $[\vec{k}_i]$, and the random ID column $[\vec{r}_i]$ with the permutation data $\langle\pi_i\rangle$ so as to generate a set composed of a post-permutation random ID column $\pi_i\vec{r}_{i-1}$, a post-permutation key column $[\pi_i\vec{k}_i]$, and a post-permutation random ID column $[\pi_i\vec{r}_i]$ and performing secret random permutation of a random ID column $[\vec{r}_{L-1}]$ with the permutation data $\langle\pi_L\rangle$ so as to generate a post-permutation random ID column $\pi_L\vec{r}_{L-1}$ with respect to $i=1, \ldots, L-1$, wherein the secret random permutation is performed after all the random ID columns have been generated with respect to $i=1, \ldots, L-1$ so as to parallelly and simultaneously perform the secret random permutation using the random ID columns;

determining whether or not $k_j=h$ is satisfied with respect to a key $[k_j]=([k_{j,0}], \ldots, [k_{j,L-1}])$ in cases of $j=0, \ldots, m-1$ and $h=0, \ldots, L-1$ so as to set a flag $[f_{j,h}]$;

creating an order table $[\vec{s}]:=(s_0, \ldots, s_{m-1})$, in which an order of each of the keys $k_0, \ldots, k_{m-1}$ in an ascending order is set, by using the flag $[f_{j,h}]$; and performing permutation of the random ID column $[\vec{r}_i]$ by a permutation function $\sigma_i$ so as to generate a post-permutation random ID column $[\sigma_i\vec{r}_i]$ with respect to $i=0, \ldots, L-1$, performing secret random permutation of an order table $[\vec{s}]$ and the post-permutation random ID column $[\sigma_i\vec{r}_i]$ with the permutation data $\langle\pi'_i\rangle$ so as to generate a post-permutation order table $\pi'_i\vec{s}$ and a post-permutation random ID column $\pi'_i\sigma_i\vec{r}_i$, performing alignment of the post-permutation random ID column $\pi'_i\sigma_i\vec{r}_i$ based on the post-permutation order table $\pi'_i\vec{s}$ so as to generate a post-alignment random ID column $\sigma_{i+1}\vec{r}_i$, setting a permutation function $\sigma_{i+1}=\vec{s}^{-1}\sigma_i$, equally couples a set composed of a post-permutation random ID column $\pi_{i+1}\vec{r}_i$, a post-permutation key column $[\pi_{i+1}\vec{k}_{i+1}]$, and a post-permutation random ID column $[\pi_{i+1}\vec{r}_{i+1}]$ with the post-alignment random ID column $\sigma_{i+1}\vec{r}_i$ by using the post-permutation random ID column $\pi_{i+1}\vec{r}_i$ as a key with respect to $i=0, \ldots, L-2$, generating a set composed of the post-alignment random ID column $\sigma_{i+1}\vec{r}_i$, a post-alignment key column $[\sigma_{i+1}\vec{k}_{i+1}]$, and a post-alignment random ID column $[\sigma_{i+1}\vec{r}_{i+1}]$, and equally coupling the post-permutation random ID column $\pi_L\vec{r}_{L-1}$ with a post-alignment random ID column $\sigma_L\vec{r}_{L-1}$ so as to generate sort permutation $\sigma\pi^{-1}_L$.

9. A non-transitory computer readable medium including computer executable instructions that make a sorting device, among a plurality of sorting devices connected over a network in a secret calculation system which performs a secret calculation technique in which data processing is performed while concealing data by secret sharing, in which data is converted into a plurality of distributed values so that original data can be restored by using a certain number or more than the certain number of pieces of distributed values, while original data cannot be restored by using distributed values of which the number of pieces is smaller than the certain number, the sorting device which generates a post-alignment value column $[\sigma\vec{v}]^V$, the post-alignment value column $[\sigma\vec{v}]^V$ being obtained by performing alignment of a value column $\vec{v}$, by inputting a set composed of a secret sharing value $[\vec{k}]$ of a column $\vec{k}$ including m pieces of keys $k_0, \ldots, k_{m-1}$ having L bits and a secret sharing value $[\vec{v}]$ of the column $\vec{v}$ including m pieces of electronic plain text values $v_0, \ldots, v_{m-1}$, perform a method, the method comprising:

receiving, as an input, the secret sharing value $[\vec{k}]$ and the secret sharing value $[\vec{v}]$;

generating permutation data $\langle\pi_i\rangle$ and $\langle\pi'_i\rangle$ so as to generate permutation data $\langle\pi_L\rangle$ with respect to $i=1, \ldots, L-1$;

generating a random ID column $[\vec{r}_i]$ which does not include mutually-overlapped values so as to generate a random ID column $[\vec{r}_L]$ which does not include mutually-overlapped values with respect to $i=1, \ldots, L-1$;

performing secret random permutation of a set composed of a random ID column $[\vec{r}_{i-1}]$, a key column $[\vec{k}_i]$, and the random ID column $[\vec{r}_i]$ with the permutation data $\langle\pi_i\rangle$ so as to generate a set composed of a post-permutation random ID column $\pi_i\vec{r}_{i-1}$, a post-permutation key column $[\pi_i\vec{k}_i]$, and a post-permutation random ID column $[\pi_i\vec{r}_i]$ and performing secret random permutation of a random ID column $[\vec{r}_{L-1}]$ and a value column $[\vec{v}]^V$ with the permutation data $\langle\pi_L\rangle$ so as to generate a post-permutation random ID column $\pi_L\vec{r}_{L-1}$ and a post-permutation value column $[\pi_L\vec{v}]^V$ with respect to $i=1, \ldots, L-1$, wherein the secret random permutation is performed after all the random ID columns have been generated with respect to $i=1, \ldots, L-1$ so as to parallelly and simultaneously perform the secret random permutation using the random ID columns;

determining whether or not $k_j=h$ is satisfied with respect to a key $[k_j]=([k_{j,0}], \ldots, [k_{j,L-1}])$ in cases of $j=0, \ldots, m-1$ and $h=0, \ldots, L-1$ so as to set a flag $[f_{j,h}]$;

creating an order table $[\vec{s}]:=(s_0, \ldots, s_{m-1})$, in which an order of each of the keys $k_0, \ldots, k_{m-1}$ in an ascending order is set, by using the flag $[f_{j,h}]$; and performing permutation of the random ID column $[\vec{r}_i]$ by a permutation function $\sigma$ so as to generate a post-permutation random ID column $[\sigma_i\vec{r}_i]$ with respect to $i=0, \ldots, L-1$, performing secret random permutation of an order table $[\vec{s}]$ and the post-permutation random ID column $[\sigma_i\vec{r}_i]$ with the permutation data $\langle\pi'_i\rangle$ so as to generate a post-permutation order table $\pi'_i\vec{s}$ and a post-permutation random ID column $\pi'_i\sigma_i\vec{r}_i$, performing alignment of the post-permutation random ID column $\pi'_i\sigma_i\vec{r}_i$ based on the post-permutation order table $\pi'_i\vec{s}$ so as to generate a post-alignment random ID column $\sigma_{i+1}\vec{r}_i$, setting a permutation function $\sigma_{i+1}=\vec{s}^{-1}\sigma_i$, equally couples a set composed of a post-permutation random ID column $\pi_{i+1}\vec{r}_i$, a post-permutation key column $[\pi_{i+1}\vec{k}_{i+1}]$, and a post-permutation random ID column $[\pi_{i+1}\vec{r}_{i+1}]$ with the post-alignment random ID column $\sigma_{i+1}\vec{r}_i$ by using the post-permutation random ID column $\pi_{i+1}\vec{r}_i$ as a key with respect to $i=0, \ldots, L-2$, generating a set composed of the post-alignment random ID column $\sigma_{i+1}\vec{r}_i$, a post-alignment key column $[\sigma_{i+1}\vec{k}_{i-1}]$, and a post-alignment random ID column $[\sigma_{i+1}\vec{r}_{i+1}]$, and equally coupling a set composed of the post-permutation random ID column $\pi_L\vec{r}_{L-1}$ and the post-permutation value column $[\pi_L \vec{v}]^V$ with a post-alignment random ID column $\sigma_L \vec{r}_{L-1}$ by using the post-permutation random ID column $\pi_L \vec{r}_{L-1}$ as a key so as to generate the post-alignment value column $[\sigma \vec{v}]^V$.

* * * * *